United States Patent
Patil et al.

(10) Patent No.: US 9,422,497 B2
(45) Date of Patent: Aug. 23, 2016

(54) SYNTHETIC LUBRICANT BASESTOCKS AND METHODS OF PREPARATION THEREOF

(71) Applicant: ExxonMobil Research and Engineering Company, Annandale, NJ (US)

(72) Inventors: Abhimanyu Onkar Patil, Westfield, NJ (US); Satish Bodige, Wayne, NJ (US)

(73) Assignee: ExxonMobil Research and Engineering Company, Annadale, NJ (US)

( * ) Notice: Subject to any disclaimer, the term of this patent is extended or adjusted under 35 U.S.C. 154(b) by 258 days.

(21) Appl. No.: 14/017,785

(22) Filed: Sep. 4, 2013

(65) Prior Publication Data

US 2014/0087984 A1    Mar. 27, 2014

Related U.S. Application Data

(60) Provisional application No. 61/703,929, filed on Sep. 21, 2012.

(51) Int. Cl.

| | |
|---|---|
| *C10M 105/32* | (2006.01) |
| *C10M 107/02* | (2006.01) |
| *C10M 107/06* | (2006.01) |
| *C08F 110/14* | (2006.01) |
| *C08F 210/14* | (2006.01) |
| *C08F 220/08* | (2006.01) |
| *C10M 105/04* | (2006.01) |
| *C10M 105/06* | (2006.01) |
| *C10G 50/00* | (2006.01) |
| *C10G 50/02* | (2006.01) |
| *C08F 10/14* | (2006.01) |

(52) U.S. Cl.
CPC .............. *C10M 105/32* (2013.01); *C08F 10/14* (2013.01); *C08F 110/14* (2013.01); *C08F 210/14* (2013.01); *C08F 220/08* (2013.01); *C10G 50/00* (2013.01); *C10G 50/02* (2013.01); *C10M 105/04* (2013.01); *C10M 105/06* (2013.01); *C10M 107/02* (2013.01); *C10M 107/06* (2013.01); *C10G 2300/1022* (2013.01); *C10G 2400/04* (2013.01); *C10G 2400/08* (2013.01); *C10G 2400/10* (2013.01); *C10M 2205/024* (2013.01); *C10M 2205/0225* (2013.01); *C10M 2205/0245* (2013.01); *C10M 2205/0285* (2013.01); *C10M 2205/043* (2013.01); *C10M 2209/0863* (2013.01); *C10N 2220/021* (2013.01); *C10N 2220/022* (2013.01); *C10N 2220/023* (2013.01); *C10N 2270/00* (2013.01)

(58) Field of Classification Search
CPC .............. C10M 105/04; C10M 105/06; C10M 105/32; C10M 107/02; C10M 107/06; C10M 2205/0225; C10M 2205/024; C10M 2205/0245; C10M 2205/0285; C10M 2205/043; C10M 2209/0863; C10N 2220/021; C10N 2220/022; C10N 2220/023; C10N 2270/00; C10G 50/00; C10G 50/02; C10G 2300/1022; C10G 2400/04; C10G 2400/08; C10G 2400/10; C08F 10/14; C08F 110/14; C08F 210/14; C08F 220/08
USPC ........................................................ 508/306
See application file for complete search history.

(56) References Cited

U.S. PATENT DOCUMENTS

| | | |
|---|---|---|
| 3,036,003 A | 5/1962 | Verdol |
| 3,149,178 A | 9/1964 | Hamilton et al. |
| 3,172,892 A | 3/1965 | LeSuer et el. |
| 3,200,107 A | 8/1965 | LeSuer |
| 3,215,707 A | 11/1965 | Rense |
| 3,219,666 A | 11/1965 | Norman et al. |
| 3,254,025 A | 5/1966 | LeSuer |
| 3,275,554 A | 9/1966 | Wagenaar |

(Continued)

FOREIGN PATENT DOCUMENTS

| | | |
|---|---|---|
| EP | 0377306 A1 | 11/1990 |
| EP | 0449453 A2 | 10/1991 |

(Continued)

OTHER PUBLICATIONS

Kolodka, E., Wang, W.-J., Zhu, S., Hamielec, A., "Synthesis and Characterization of Long-Chain-Branched Polyolefins with Metallocene Catalysts: Copolymerization of Ethylene with Poly(ethylene-co-propylene) Macromonomer", Marcomol. Rapid Commun. 2003, 24, 311-315.*

(Continued)

*Primary Examiner* — James Goloboy
(74) *Attorney, Agent, or Firm* — Robert A. Migliorini

(57) ABSTRACT

This disclosure relates to vinyl terminated macromer (VTM) based synthetic basestocks and their methods of preparation, lubricant compositions, methods of lubrication and products so lubricated. The VTM based synthetic basestocks useful for fuels and lubricants include oligomerization or polymerization products of one or more allylic vinyl terminated macromers (VTMs) having a molecular weight from 84 to 10080. The one or more allylic VTMs are oligomerized or polymerized in the presence of a catalyst under oligomerization or polymerization conditions sufficient to give the VTM based synthetic basestock. The catalyst can be a metallocene catalyst or an acid catalyst, e.g., Lewis acid. The one or more allylic vinyl terminated macromers (VTMs) can be one or more allylic vinyl terminated atactic polypropylene macromers (VTM aPP) having a molecular weight from 84 to 2250 and having a terminal allylic vinyl olefin content of at least 90%.

17 Claims, 1 Drawing Sheet

(56) References Cited

U.S. PATENT DOCUMENTS

| | | | |
|---|---|---|---|
| 3,316,177 A | 4/1967 | Dorer, Jr. | |
| 3,329,658 A | 7/1967 | Fields | |
| 3,341,542 A | 9/1967 | LeSuer et al. | |
| 3,413,347 A | 11/1968 | Worrell | |
| 3,438,757 A | 4/1969 | Honnen et al. | |
| 3,444,170 A | 5/1969 | Norman et al. | |
| 3,449,250 A | 6/1969 | Fields | |
| 3,454,555 A | 7/1969 | van der Voort et al. | |
| 3,454,607 A | 7/1969 | LeSuer et al. | |
| 3,519,565 A | 7/1970 | Coleman | |
| 3,541,012 A | 11/1970 | Stuebe | |
| 3,565,804 A | 2/1971 | Honnen et al. | |
| 3,630,904 A | 12/1971 | Musser et al. | |
| 3,632,511 A | 1/1972 | Liao | |
| 3,666,730 A | 5/1972 | Coleman | |
| 3,687,849 A | 8/1972 | Abbott | |
| 3,697,574 A | 10/1972 | Piasek et al. | |
| 3,702,300 A | 11/1972 | Coleman | |
| 3,725,277 A | 4/1973 | Worrel | |
| 3,725,480 A | 4/1973 | Traise et al. | |
| 3,726,882 A | 4/1973 | Traise et al. | |
| 3,787,374 A | 1/1974 | Adams | |
| 4,100,082 A | 7/1978 | Clason et al. | |
| 4,234,435 A | 11/1980 | Meinhardt et al. | |
| 4,454,059 A | 6/1984 | Pindar et al. | |
| 4,827,064 A | 5/1989 | Wu | |
| 4,827,073 A | 5/1989 | Wu | |
| 4,956,122 A | 9/1990 | Watts et al. | |
| 4,978,464 A | 12/1990 | Coyle et al. | |
| 5,068,487 A | 11/1991 | Theriot | |
| 5,616,153 A | 4/1997 | Mike et al. | |
| 5,705,485 A | 1/1998 | Cini et al. | |
| 6,017,859 A | 1/2000 | Rossi et al. | |
| 6,066,603 A | 5/2000 | Emert et al. | |
| 6,824,671 B2 | 11/2004 | Goze et al. | |
| 6,897,261 B1 * | 5/2005 | Machida | C08F 290/04 525/240 |
| 2007/0043248 A1 | 2/2007 | Wu et al. | |
| 2008/0020928 A1 | 1/2008 | Wu et al. | |
| 2008/0177121 A1 | 7/2008 | Wu et al. | |
| 2009/0005279 A1 | 1/2009 | Wu et al. | |
| 2009/0036725 A1 | 2/2009 | Wu et al. | |
| 2009/0240012 A1 | 9/2009 | Patil et al. | |
| 2009/0247442 A1 | 10/2009 | Hagemeister et al. | |
| 2009/0318640 A1 * | 12/2009 | Brant | C08F 10/00 526/75 |
| 2009/0318644 A1 | 12/2009 | Brant et al. | |
| 2009/0318646 A1 | 12/2009 | Brant et al. | |
| 2010/0292424 A1 | 11/2010 | Wu et al. | |
| 2011/0178348 A1 | 7/2011 | Heilman et al. | |
| 2012/0309658 A1 * | 12/2012 | Carey | C10M 111/04 526/463 |

FOREIGN PATENT DOCUMENTS

| | | |
|---|---|---|
| EP | 0471071 B1 | 8/1995 |
| EP | 1040115 B1 | 6/2004 |
| GB | 1043629 | 9/1966 |
| WO | 98/03617 A1 | 1/1998 |
| WO | 9931113 A1 | 6/1999 |
| WO | 2007011459 A1 | 1/2007 |
| WO | 2007011832 A1 | 1/2007 |
| WO | 2007011973 A1 | 1/2007 |
| WO | 2008010862 A1 | 1/2008 |
| WO | 2008010865 A2 | 1/2008 |
| WO | 2009017953 A2 | 2/2009 |
| WO | 2009097069 A1 | 8/2009 |
| WO | 2009117110 A2 | 9/2009 |
| WO | 2009123800 A1 | 10/2009 |
| WO | 2009155471 A2 | 12/2009 |

OTHER PUBLICATIONS

The International Search Report and Written Opinion of PCT/US2013/058191 dated Mar. 3, 2014.

Y.V. Kissin, "Post-Oligomerization of alpha-Olefin Oligomers: A Route to Single-Component and Multicomponent Synthetic Lubricating Oils", Journal of Applied Polymer Science, 2009, vol. 11, pp. 273-280.

L. Resconi, F. Piemontesi, G. Franciscono, L. Abis and T. Forani, "Olefin Polymerization at Bis(pentamethylcyclopentadienyl)zirconium and -halfnium Centers: Chain-Transfer Mechanisms", J. Am. Chem. Soc., 1992, vol. 114, pp. 1025-1032.

T. Sun, P. Brant, R.R. Chane and W.W. Graessley, "Effect of Short Chain Branching on the Coil Dimensions of Polyolefins in Dilute Solution", Macromolecules, 2001, vol. 34, pp. 6812-6820.

* cited by examiner

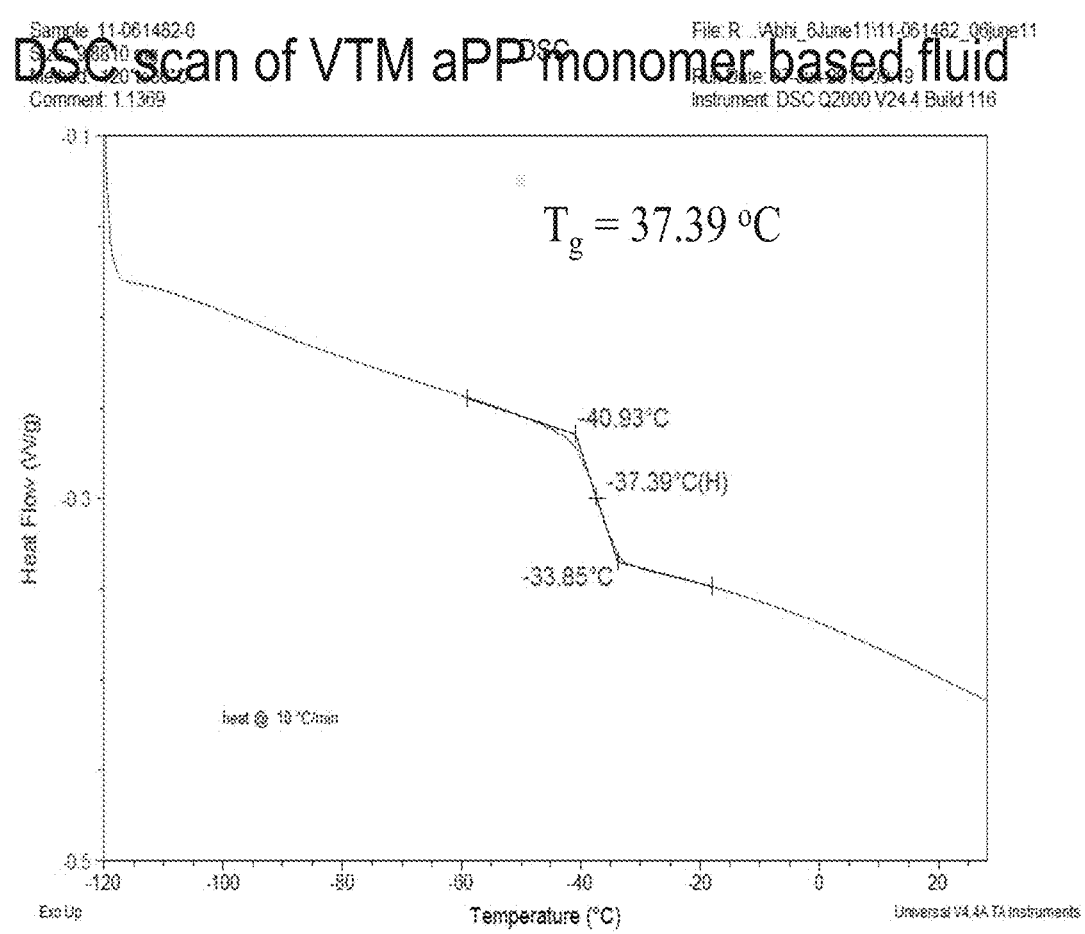

US 9,422,497 B2

SYNTHETIC LUBRICANT BASESTOCKS AND METHODS OF PREPARATION THEREOF

CROSS-REFERENCE TO RELATED APPLICATIONS

This application claims priority to U.S. Provisional Application Ser. No. 61/703,929 filed Sep. 21, 2012, herein incorporated by reference in its entirety.

FIELD

This disclosure relates to vinyl terminated macromer (VTM) based synthetic basestocks and their methods of preparation, lubricant compositions, methods of lubrication and products so lubricated.

BACKGROUND

Lubricants in commercial use today are prepared from a variety of natural and synthetic basestocks admixed with various additive packages and solvents depending upon their intended application. The basestocks typically include mineral oils, poly alpha-olefins (PAO), gas-to-liquid base oils (GTL), silicone oils, phosphate esters, diesters, polyol esters, and the like.

A major trend for passenger car engine oils (PCEOs) is an overall improvement in quality as higher quality basestocks become more readily available. Typically the highest quality PCEO products are formulated with basestocks such as PAOs or GTL stocks.

Lubricants are composed of a basestock and additives. Additives are added to the basestock either to enhance an already-existing property, such as viscosity, of base oil or impart a new property, such as detergency, lacking in the base oil. The lubricants are designed to perform a number of functions, including lubrication, cooling, protection against corrosion, and keeping equipment components clean by suspending originally insoluble contaminants in the bulk lubricant.

Polyalphaolefin (PAO) fluids are premium synthetic basestocks and are produced via oligomerization of alpha-olefins, such as 1-decene. 1-Decene feed can be expensive and in short supply. The product obtained by 1-decene feed can have poor low temperature properties. Therefore, generally a mixed feed of $C_6/C_{10}/C_4$ or $C_8/C_{12}$ alpha-olefins is used.

Conventional PAOs are produced using promoted $BF_3$ or $AlCl_3$ catalysts. Several companies, including Chemtura, Chevron-Phillips and Ineos produce various grades of conventional PAOs using similar class of chemistry.

Additional references of interest include: U.S. Application Publication No. 2011/0178348; U.S. Application Publication No. 2010/0292424; U.S. Application Publication No. 2009/0036725; Rutgers University, Y. V. Kissin, F. C. Schwab; Journal of Applied Polymer Science, Volume 111, Issue 1, 5 Jan. 2009, pages 273-280; EP 0377306; GB 1043629; U.S. Application Publication No. 2009/0318640; and JP 06313007.

The present disclosure provides many advantages in meeting these needs, which shall become apparent as described below.

SUMMARY

This disclosure relates in part to a process for the preparation of VTM based synthetic basestocks which comprises oligomerizing or polymerizing one or more allylic VTMs having a molecular weight from 84 to 10080, in the presence of a catalyst and under oligomerization or polymerization conditions sufficient to give the VTM based synthetic basestocks. The catalyst comprises a metallocene catalyst or an acid catalyst. The one or more allylic VTMs preferably comprise one or more allylic vinyl terminated atactic polypropylene macromers (VTM aPPs) having a molecular weight from 84 to 2520 and having a terminal allylic vinyl olefin content of at least 90%.

This disclosure also relates in part to a process for the preparation of VTM based synthetic basestocks which comprises oligomerizing or polymerizing one or more VTMs in the presence of a catalyst and under oligomerization or polymerization conditions sufficient to give the VTM based synthetic basestocks. The VTMs are produced by the oligomerization of an alpha-olefin feed which comprises ethylene/alpha-olefin monomers or propylene/alpha-olefin monomers. The catalyst comprises a metallocene catalyst or an acid catalyst.

This disclosure further relates in part to a process for the preparation of VTM based synthetic basestocks which comprises co-oligomerizing or co-polymerizing one or more allylic VTMs having a molecular weight from 84 to 10080, and one or more alpha-olefins, in the presence of a catalyst and under co-oligomerization or co-polymerization conditions sufficient to give the VTM based synthetic basestocks. The catalyst comprises a metallocene catalyst or an acid catalyst. The one or more allylic VTMs comprise one or more allylic vinyl terminated atactic polypropylene macromers (VTM aPPs) having a molecular weight from 84 to 2520 and having a terminal allylic vinyl olefin content of at least 90%.

This disclosure yet further relates in part to a composition for use as a basestock for fuels and lubricants comprising an oligomerization or polymerization product of one or more allylic VTMs having a molecular weight from 84 to 10080. The one or more allylic VTMs are oligomerized or polymerized in the presence of a catalyst under oligomerization or polymerization conditions sufficient to give the composition. The one or more allylic VTMs comprise one or more allylic vinyl terminated atactic polypropylene macromers (VTM aPPs) having a molecular weight from 84 to 2520 and having a terminal allylic vinyl olefin content of at least 90%.

This disclosure also relates in part to a composition for use as a basestock for fuels and lubricants comprising an oligomerization or polymerization product of one or more VTMs. The one or more VTMs are oligomerized or polymerized in the presence of a catalyst under oligomerization or polymerization conditions sufficient to give the composition. The one or more VTMs are produced by the oligomerization of an alpha-olefin feed. The alpha-olefin feed comprises ethylene/alpha-olefin monomers or propylene/alpha-olefin monomers.

This disclosure further relates in part to a composition for use as a basestock for fuels and lubricants comprising a co-oligomerization or co-polymerization product of one or more allylic VTMs having a molecular weight from 84 to 10080, and one or more alpha-olefins. The one or more allylic VTMs and the one or more alpha-olefins are co-oligomerized or co-polymerized in the presence of a catalyst under co-oligomerization or co-polymerization conditions sufficient to give the composition. The one or more allylic VTMs comprise one or more allylic vinyl terminated atactic polypropylene macromers (VTM aPP) having a molecular weight from 84 to 2250 and having a terminal allylic vinyl olefin content of at least 90%.

This disclosure yet further relates in part to a composition for use as a basestock for fuels and lubricants comprising one or more VTMs having a molecular weight from 84 to 10080. The one or more VTMs are hydrogenated under hydrogenation conditions sufficient to give the composition.

This disclosure also relates in part to a composition for use as a basestock for fuels and lubricants comprising one or more allylic vinyl terminated atactic polypropylene macromers (VTM aPPs) having a molecular weight from 84 to 2520 and having a terminal allylic vinyl olefin content of at least 90%.

This disclosure yet further relates in part to a process for the preparation of VTM based synthetic basestocks which comprises oligomerizing or polymerizing one or more allylic vinyl terminated atactic polypropylene macromers (VTM aPPs) having a molecular weight from 84 to 2520 and having a terminal allylic vinyl olefin content of at least 90%, in the presence of a metallocene catalyst and under oligomerization or polymerization conditions sufficient to give the VTM based synthetic basestocks.

This disclosure also relates in part to process for the preparation of VTM based synthetic basestocks which comprises oligomerizing or polymerizing one or more VTMs in the presence of a metallocene catalyst and under oligomerization or polymerization conditions sufficient to give the VTM based synthetic basestocks. The VTMs are produced by the oligomerization of an alpha-olefin feed. The alpha-olefin feed comprises ethylene/alpha-olefin monomers or propylene/alpha-olefin monomers.

This disclosure further relates in part to a process for the preparation of VTM based synthetic basestocks which comprises co-oligomerizing or co-polymerizing one or more allylic vinyl terminated atactic polypropylene macromers (VTM aPPs) having a molecular weight from 84 to 2250 and having a terminal allylic vinyl olefin content of at least 90%, with one or more olefins, in the presence of a metallocene catalyst and under oligomerization or polymerization conditions sufficient to give the VTM based synthetic basestocks.

This disclosure yet further relates in part to a composition for use as a basestock for fuels and lubricants comprising an oligomerization or polymerization product of one or more allylic vinyl terminated atactic polypropylene macromers (VTM aPPs) having a molecular weight from 84 to 2520 and having a terminal allylic vinyl olefin content of at least 90%. The one or more VTM aPPs are oligomerized or polymerized in the presence of a metallocene catalyst under oligomerization or polymerization conditions sufficient to give the composition.

This disclosure also relates in part to a composition for use as a basestock for fuels and lubricants comprising an oligomerization or polymerization product of one or more VTMs. The one or more VTMs are oligomerized or polymerized in the presence of a metallocene catalyst under oligomerization or polymerization conditions sufficient to give the composition. The one or more VTMs are produced by the oligomerization of an alpha-olefin feed. The alpha-olefin feed comprises ethylene/alpha-olefin monomers or propylene/alpha-olefin monomers.

This disclosure further relates in part to a composition for use as a basestock for fuels and lubricants comprising a co-oligomerization or co-polymerization product of one or more allylic vinyl terminated atactic polypropylene macromers (VTM aPPs) having a molecular weight from 84 to 2250 and having a terminal allylic vinyl olefin content of at least 90%, and one or more olefins. The one or more VTM aPPs and the one or more olefins are co-oligomerized or co-polymerized in the presence of a metallocene catalyst under oligomerization or polymerization conditions sufficient to give the composition.

This disclosure also relates in part to a composition for use as a basestock for fuels and lubricants comprising one or more VTMs having a molecular weight from 84 to 10080.

This disclosure further relates in part to a composition for use as a basestock for fuels and lubricants comprising one or more allylic vinyl terminated atactic polypropylene macromers (VTM aPPs) having a molecular weight from 84 to 2520 and having a terminal allylic vinyl olefin content of at least 90%.

This disclosure yet further relates in part to a process for the preparation of VTM based synthetic basestocks which comprises oligomerizing or polymerizing one or more allylic VTMs having a molecular weight from 84 to 10080, in the presence of a catalyst and under oligomerization or polymerization conditions sufficient to give the VTM based synthetic basestocks.

This disclosure also relates in part to process for the preparation of VTM based synthetic basestocks which comprises oligomerizing or polymerizing one or more allylic vinyl terminated atactic polypropylene macromers (VTM aPPs) having a molecular weight from 84 to 2520 and having a terminal allylic vinyl olefin content of at least 90%, in the presence of a catalyst and under oligomerization or polymerization conditions sufficient to give the VTM based synthetic basestocks.

This disclosure further relates in part to a process for the preparation of VTM based synthetic basestocks which comprises co-oligomerizing or co-polymerizing one or more allylic VTMs having a molecular weight from 84 to 10080, and one or more alpha-olefins, in the presence of a catalyst and under co-oligomerization or co-polymerization conditions sufficient to give the VTM based synthetic basestocks.

This disclosure yet further relates in part to a process for the preparation of VTM based synthetic basestocks which comprises co-oligomerizing or co-polymerizing one or more allylic vinyl terminated atactic polypropylene macromers (VTM aPPs) having a molecular weight from 84 to 10080 and having a terminal allylic vinyl olefin content of at least 90%, and one or more alpha-olefins, in the presence of a catalyst and under co-oligomerization or co-polymerization conditions sufficient to give the VTM based synthetic basestocks.

This disclosure also relates in part to a composition for use as a basestock for fuels and lubricants comprising an oligomerization or polymerization product of one or more allylic VTMs having a molecular weight from 84 to 10080. The one or more allylic VTMs are oligomerized or polymerized in the presence of a catalyst under oligomerization or polymerization conditions sufficient to give the composition.

This disclosure further relates in part to a composition for use as a basestock for fuels and lubricants comprising an oligomerization or polymerization product of one or more allylic vinyl terminated atactic polypropylene macromers (VTM aPPs) having a molecular weight from 84 to 2520 and having a terminal allylic vinyl olefin content of at least 90%. The one or more VTM aPPs are oligomerized or polymerized in the presence of a catalyst under oligomerization or polymerization conditions sufficient to give the composition.

This disclosure yet further relates in part to a composition for use as a basestock for fuels and lubricants comprising a co-oligomerization or co-polymerization product of one or more allylic VTMs having a molecular weight from 84 to 10080, and one or more alpha-olefins. The one or more allylic VTMs and the one or more alpha-olefins are co-oligomerized or co-polymerized in the presence of a catalyst under co-oligomerization or co-polymerization conditions sufficient to give the composition.

This disclosure also relates in part to composition for use as a basestock for fuels and lubricants comprising a co-oligomerization or co-polymerization product of one or more allylic vinyl terminated atactic polypropylene macromers (VTM aPP) having a molecular weight from 84 to 2250 and having a terminal allylic vinyl olefin content of at least 90%, and one or more alpha-olefins. The one or more VTM aPPs and the one or more alpha-olefins are co-oligomerized or co-polymerized in the presence of a metallocene catalyst under oligomerization or polymerization conditions sufficient to give the composition.

This disclosure further relates in part to a vehicle having moving parts and containing a lubricant for lubricating the moving parts. The lubricant comprises an oil of lubricating viscosity and from 0.1 to 15 weight percent based on the total weight of the lubricant composition, of any of the compositions described herein.

This disclosure yet further relates in part to a method for tuning one or more properties of VTM based synthetic basestocks, e.g., tuning lubricant properties of a lubricating oil basestock. The method comprises selecting one or more vinyl terminated macromers (VTMs), wherein the VTMs are produced by the oligomerization of an alpha-olefin feed, the alpha-olefin feed comprising ethylene/alpha-olefin monomers or propylene/alpha-olefin monomers; and oligomerizing or polymerizing the one or more VTMs in the presence of a catalyst and under oligomerization or polymerization conditions sufficient to give the VTM based synthetic basestocks. The ethylene/alpha-olefin monomers include, for example, ethylene/propylene, ethylene/1-butene, ethylene/1-hexene, ethylene/1-octene, ethylene/1-decene, ethylene/1-dodecene, ethylene/1-tetradecene, ethylene/1-hexadecene and/or ethylene/1-octadecene. The propylene/alpha-olefin monomers include, for example, propylene/ethylene, propylene/1-butene, propylene/1-hexene, propylene/1-octene, propylene/1-decene, propylene 1-dodecene, propylene/1-tetradecene, propylene/1-hexadecene and/or propylene/1-octadecene. The properties that can be tuned in accordance with the method of this disclosure include, for example, viscosity ($Kv_{100}$ cSt), viscosity index (VI), pour point (° C.), glass transition temperature (° C.), and oxidative stability (° C.).

This disclosure further relates in part to lubricant compositions comprising a lubricating oil basestock having any one of the compositions described herein.

It has been surprisingly found that VTMs based on cost effective monomers like propylene, ethylene, 1-butene can be easily polymerized or copolymerized with alpha-olefins using acidic catalysts or metallocene catalyst to obtained lubricant basestocks with tunable properties. The oligomerization processes convert non-lubricant range material into lubricant range or higher mw material with a kinematic viscosity at 100° C. of 300+ cSt and a VI greater than 100. The cost competitive VTMs eliminate the need for expensive monomers like 1-decene that are often in short supply.

Further objects, features and advantages of the present disclosure will be understood by reference to the following definitions, drawing and detailed description.

DEFINITIONS

In the structures depicted throughout this specification and the claims, a solid line indicates a bond, and an arrow indicates that the bond may be dative.

As used herein, the new notation for the Periodic Table Groups is used as described in *Chemical and Engineering News*, 63(5), 27 (1985).

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

The terms "hydrocarbyl radical," "hydrocarbyl," and "hydrocarbyl group" are used interchangeably throughout this document. Likewise, the terms "functional group," "group," and "substituent" are also used interchangeably in this document. For purposes of this disclosure, "hydrocarbyl radical" is defined to be $C_1$ to $C_{20}$ radicals, that may be linear, branched, or cyclic (aromatic or non-aromatic); and may include substituted hydrocarbyl radicals as defined herein. In an embodiment, a functional group may comprise a hydrocarbyl radical, a substituted hydrocarbyl radical, or a combination thereof.

Substituted hydrocarbyl radicals are radicals in which at least one hydrogen atom has been substituted with a heteroatom or heteroatom containing group, or with atoms from Groups 13, 14, 15, 16, and 17 of the Periodic Table of Elements, or a combination thereof, or with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen or a hydrocarbyl radical, or any combination thereof.

In an embodiment, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated, and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including, where appropriate, cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (analogous substituted cyclobutyls and cyclopropyls); and butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (cyclobutenyls and cyclopropenyls). Cyclic compounds having substitutions include all isomer forms, for example, methylphenyl would include ortho-methylphenyl, meta-methylphenyl, and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is a polymer having a low molecular weight. In some embodiments, an oligomer has an Mn of 21,000 g/mol or less (e.g., 2,500 g/mol or less); in other embodiments, an oligomer has a low number of mer units (such as 75 mer units or less).

An "alpha-olefin" is an olefin having a double bond at the alpha (or 1-) position. A "linear alpha-olefin" or "LAO" is an olefin with a double bond at the alpha position and a linear hydrocarbon chain. A "polyalphaolefin" or "PAO" is a polymer having two or more alpha-olefin units. For the purposes of this disclosure, the term "α-olefin" includes $C_2$-$C_{20}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

For purposes herein, a polymer or polymeric chain comprises a concatenation of carbon atoms bonded to each other in a linear or a branched chain, which is referred to herein as the backbone of the polymer (e.g., polyethylene). The polymeric chain may further comprise various pendent groups attached to the polymer backbone which were present on the monomers from which the polymer was produced. These pendent groups are not to be confused with branching of the polymer backbone, the difference between pendent side chains and both short and long chain branching being readily understood by one of skill in the art.

The terms "catalyst" and "catalyst compound" are defined to mean a compound capable of initiating catalysis. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is a combination of at least one catalyst compound, an optional activator, an optional co-activator, and an optional support material, where the system can polymerize monomers to polymer. For the purposes of this disclosure and the claims thereto, when catalyst systems are described as comprising neutral stable forms of the components, it is well understood by one of ordinary skill in the art, that the ionic form of the component is the form that reacts with the monomers to produce polymers.

An "anionic ligand" is a negatively charged ligand which donates one or more pairs of electrons to a metal ion. A "neutral donor ligand" is a neutrally charged ligand which donates one or more pairs of electrons to a metal ion.

A "scavenger" is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the catalyst compound to form an alkylated catalyst compound, also referred to as an alkylated disclosure compound.

A propylene polymer is a polymer having at least 50 mol % of propylene. As used herein, Mn is number average molecular weight as determined by proton nuclear magnetic resonance spectroscopy ($^1$H NMR) where the data is collected at 120° C. in a 5 mm probe using a spectrometer with a $^1$H frequency of at least 400 MHz. Data is recorded using a maximum pulse width of 45° C., 8 seconds between pulses and signal averaging 120 transients. Unless stated otherwise, Mw is weight average molecular weight as determined by gel permeation chromatography (GPC), Mz is z average molecular weight as determined by GPC as described in the Vinyl Terminated Macromonomers section below, wt % is weight percent, and mol % is mole percent. Molecular weight distribution (MWD) is defined to be Mw (GPC) divided by Mn ($^1$H NMR). Unless otherwise noted, all molecular weight units, e.g., Mw, Mn, Mz, are g/mol.

The following abbreviations may be used through this specification: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is triisobutylaluminum, TNOAL is triisobutyl n-octylaluminum, MAO is methylalumoxane, pMe is para-methyl, Ar* is 2,6-diisopropylaryl, Bz is benzyl, THF is tetrahydrofuran, RT is room temperature which is defined as 25° C. unless otherwise specified, and tol is toluene.

The term "phr" is parts per hundred rubber or "parts", and is a measure common in the art wherein components of a composition are measured by weight, relative to a total weight of all of the elastomer components. The total phr or parts for all rubber components, whether one, two, three, or more different rubber components is present in a given recipe is always defined as 100 phr. All other non-rubber components are ratioed by weight against the 100 parts of rubber and are expressed in phr. This way one can easily compare, for example, the levels of curatives or filler loadings, etc., between different compositions based on the same relative proportion of rubber without the need to recalculate percents for every component after adjusting levels of only one, or more, component(s).

BRIEF DESCRIPTION OF DRAWINGS

To assist those of ordinary skill in the relevant art in making and using the subject matter hereof, reference is made to the appended drawing, wherein:

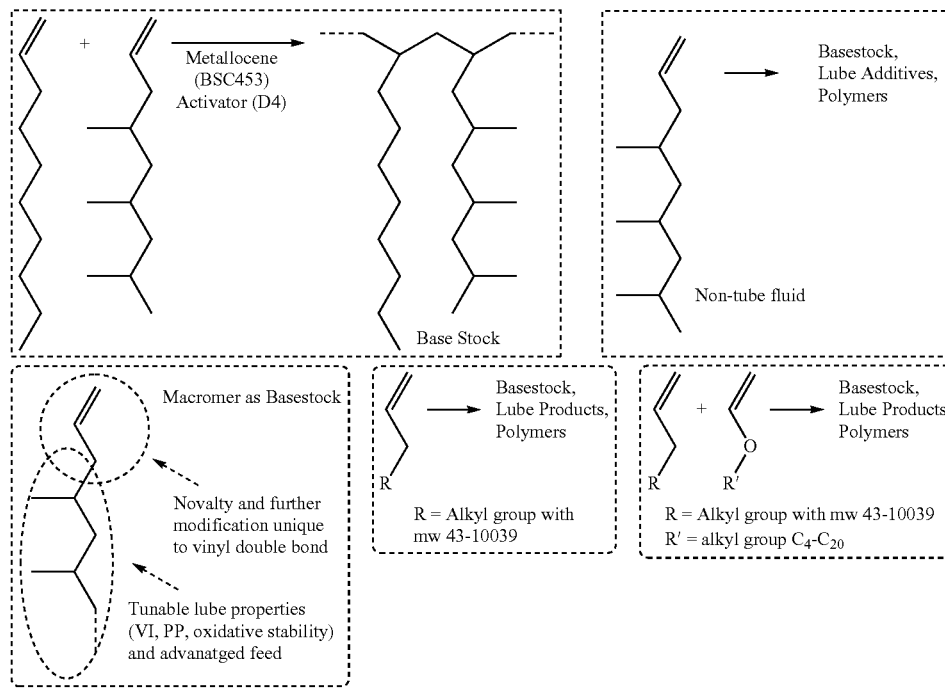

FIG. 1 depicts a differential scanning calorimetry scan of a VTM for a PP monomer based fluid.

DETAILED DESCRIPTION

All numerical values within the detailed description and the claims herein are modified by "about" or "approximately" the indicated value, and take into account experimental error and variations that would be expected by a person having ordinary skill in the art.

The present disclosure relates to vinyl terminated macromer (VTM) based synthetic basestocks and their methods of preparation, lubricant compositions, methods of lubrication and products so lubricated. The VTM based synthetic basestocks useful for fuels and lubricants include oligomerization or polymerization products of one or more allylic VTMs having a molecular weight from 84 to 10080. The one or more allylic VTMs are oligomerized or polymerized in the presence of a catalyst under oligomerization or polymerization conditions sufficient to give the VTM based synthetic basestock. The catalyst can be a metallocene catalyst or an acid catalyst, e.g., Lewis acid. The one or more allylic vinyl terminated macromers (VTMs) can be one or more allylic vinyl terminated atactic polypropylene macromers (VTM aPP) having a molecular weight from 84 to 2250 and having a terminal allylic vinyl olefin content of at least 90%.

This disclosure also relates to oligomerization and polymerization processes that convert non-lubricant range materials into lubricant range higher molecular weight polymers with a $KV_{100}$>300+ cSt and a VI>100 which can be used in lubricating oil formulations as basestock. The macromer polymerization/copolymerization and oligomerization/co-oligomerization processes described herein leading to high molecular weight material can be uses as viscosity index improvers and various other polymer or lube type applications.

In accordance with this disclosure, a metallocene process is provided for oligomerizing or polymerizing low to medium molecular weight allylic vinyl terminated atactic polypropylene (VTM aPP) macromers having a molecular weight in the range of 84 to 2520 and having a terminal allylic vinyl olefin content of at least 90%. Also, in accordance with this disclosure, a process is provided for oligomerizing or polymerizing low to medium molecular weight vinyl terminated macromers obtained by oligomerization of ethylene/alpha-olefin or propylene/alpha-olefin monomers. Further, in accordance with this disclosure, a process for co-oligomerizing α-olefins (such as 1-hexene, 1-octene, 1-decene, 1-dodecene, 1-tetradecene, 1-octadecene or mixtures thereof) or internal olefins (linear or branched), styrene and derivatives with allylic vinyl terminated macromers described herein having a terminal allylic vinyl olefin content of at least 90%.

This disclosure relates to the use of VTM macromers as synthetic fluids. Low mw polymers prepared using organometallic catalysts (Z—N, metallocene) and cost effective feeds, such as ethylene, propylene, and 1-butene, are good basestocks. The lube properties of the fluids can be tunable using combination of feed and composition. The disclosure also relates to a process for polymerization of allylic vinyl terminated macromers. The macromers can have mw range of 84 to 10080. The preferred macromers are atactic polypropylene (VTM aPP) having mw range of 84 to 2520 and having a terminal allylic vinyl olefin content of at least 90%.

This disclosure also relates a process for copolymerizing alpha-olefins (such as 1-hexene, 1-octene, 1-decene, 1-dodecene, 1-tetradecene, 1-octadecene or mixtures thereof), internal olefins (linear or branched) with allylic VTM aPP or ethylene/propylene (VTM EP) or ethylene/butene (VTM EB) or other mixed ethylene and alpha-olefins (e.g., ethylene/1-hexene, ethylene/1-octene, ethylene/1-decene, propylene/1-butene, propylene/1-hexene, propylene/1-octene, propylene/1-decene, and the type) macromers having a mw range of 84 to 2520 and having a terminal allylic vinyl olefin content of at least 90%. Preferably, the polymerization reaction is carried out in the presence of Friedel-Crafts acid catalysts, such as $AlCl_3$ or $BF_3$ or their promoted version. Other types of acid catalysts can also be used. This disclosure also includes a process for copolymerizing monomers like styrene and derivatives (p-methylstyrene, alpha-methylstyrene, etc), isobutylene, vinyl ethers, N-vinylcarbazole, etc. with macromers described herein.

In another aspect of this disclosure, the allylic vinyl terminated macromers can be obtained using other monomers. For example allylic VTMs can be prepared using monomers such as ethylene/propylene (VTM EP) or ethylene/butene (VTM EB) or other mixed ethylene and alpha-olefins (e.g., ethylene/1-hexene, ethylene/1-octene, ethylene/1-decene, propylene/1-butene, propylene/1-hexene, propylene/1-octene, propylene/1-decene, and the type) macromers having a molecular weight in the range of 84 to 2520 and having a terminal allylic vinyl olefin content of at least 90%. Such macromers will be cost effective synthetic basestock.

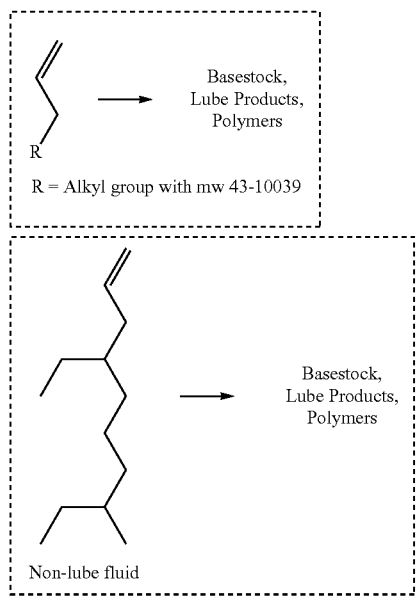

In yet another aspect of this disclosure, the allylic vinyl terminated macromers can be copolymerized with monomers like styrene and derivatives (p-methylstyrene, alpha-methylstyrene, etc), isobutylene, vinyl ethers, N-vinylcarbazole, etc. Such polymers can be VI or dispersant-viscosity modifiers.

Both VTMs and vinyl ether can be polymerized using cationic polymerization. The high mw polymers can be used as multifunctional viscosity modifiers.

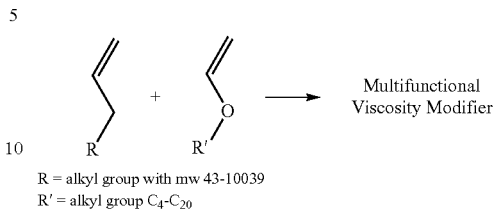

R = alkyl group with mw 43-10039
R' = alkyl group $C_4$-$C_{20}$

The carbocation polymerization technology is compatible with synthetic technology know-how of this disclosure.

This disclosure further relates to the use of vinyl terminated macromers obtained by oligomerization of propylene, propylene/alpha-olefin or ethylene/alpha-olefin monomers. Alpha-olefins, especially those containing 6 to 14 carbon atoms have been used as monomers for linear low density polyethylene or for synthesis of polyalphaolefin basestocks. Allyl terminated low molecular weight liquids have been produced using various catalysts and processes as described herein.

This disclosure yet further relates to a process for polymerization of allylic vinyl terminated macromers. The macromers can have a molecular weight in the range of 84 to 10080. The preferred macromers are atactic polypropylene (VTM aPP) macromers having a molecular weight in the range of 84 to 2520 and having a terminal allylic vinyl olefin content of at least 90%. This disclosure also relates to a process for copolymerizing alpha-olefins (such as 1-decene, 1-octene, 1-dodecene, 1-hexene, 1-tetradecene, 1-octadecene or mixtures thereof), internal olefins (linear or branched) with low to medium molecular weight allylic vinyl terminated atactic polypropylene (VTM aPP) or ethylene/propylene (VTM EP) or ethylene/butene (VTM EB) or other mixed ethylene and alpha-olefins (i.e. ethylene/1-hexene, ethylene/1-octene, ethylene/1-decene, propylene/1-butene, propylene/1-hexene, propylene/1-octene, propylene/1-decene, and the type) macromers having a molecular weight in the range of 84 to 2520 and having a terminal allylic vinyl olefin content of at least 90%. Preferably, the polymerization reaction is carried out in the presence of Friedel-Crafts acid catalysts, such as $AlCl_3$ or $BF_3$ or their promoted version. Other types of acid catalysts can also be used.

The disclosure relates to the use of vinyl terminated oligomers obtained by oligomerization of propylene, propylene/alpha-olefin or ethylene/alpha-olefin as monomer or comonomer. Alpha-olefins, especially those containing 6 to 14 carbon atoms have been used as monomers for linear low density polyethylene or for synthesis of polyalphaolefin basestocks. Allyl terminated low molecular weight liquids have been produced using various catalysts and processes.

This disclosure also relates to a process for copolymerizing monomers like maleic anhydride, styrene and derivatives (p-methylstyrene, alpha-methylstyrene, etc), isobutylene, vinyl ethers, N-vinylcarbazole, etc. with low molecular weight allylic vinyl terminated atactic polypropylene (VTM aPP) oligomers having a molecular weight in the range of 84 to 2520 and having a terminal allylic vinyl olefin content of at least 90%, a Basestock, Lube Products, Polymers

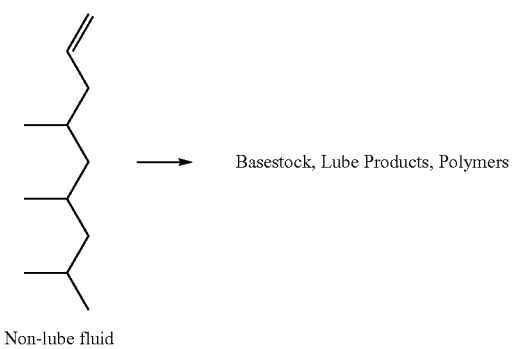

Non-lube fluid → Basestock, Lube Products, Polymers

The oligomerization processes convert non-lubricant range material into lubricant range or higher molecular weight material with a kinematic viscosity at 100° C. of 300+ cSt and a VI greater than 100 which can be used in lubricating oil formulations as basestock. High molecular weight material can be uses as VI or thickener type applications.

This disclosure further relates to a method for tuning one or more properties of VTM based synthetic basestocks, e.g., tuning lubricant properties of a lubricating oil basestock. The method comprises selecting one or more VTMs, wherein the VTMs are produced by the oligomerization of an alpha-olefin feed, the alpha-olefin feed comprising ethylene/alpha-olefin monomers or propylene/alpha-olefin monomers; and oligomerizing or polymerizing the one or more VTMs in the presence of a catalyst and under oligomerization or polymerization conditions sufficient to give the VTM based synthetic basestocks. The ethylene/alpha-olefin monomers include, for example, ethylene/propylene, ethylene/1-butene, ethylene/1-hexene, ethylene/1-octene, ethylene/1-decene, ethylene/1-dodecene, ethylene/1-tetradecene, ethylene/1-hexadecene and/or ethylene/1-octadecene. The propylene/alpha-olefin monomers include, for example, propylene/ethylene, propylene/1-butene, propylene/1-hexene, propylene/1-octene, propylene/1-decene, propylene/1-dodecene, propylene/1-tetradecene, propylene/1-hexadecene and/or propylene/1-octadecene. The properties that can be tuned in accordance with the method of this disclosure include, for example, viscosity ($Kv_{100}$ cSt), viscosity index (VI), pour point (° C.), glass transition temperature (° C.), and oxidative stability (° C.).

This disclosure further relates to the use of VTMs described herein as synthetic fluids. Preferably, the VTMs are hydrogenated to remove terminal unsaturation prior to use as a lubricant synthetic basestock. The hydrogenation can be conducted by conventional methods known in the art.

Lubricating Oil Basestocks

The lubricating oil basestocks of this disclosure are based on synthetic Group IV PAOs. In an embodiment, the synthetic Group IV PAOs of this disclosure can be mixed with other basestocks from Group I, Group II, Group III, Group IV, Group V and Group VI. For example, to the Group IV PAOs of this disclosure can be added one or more of Group V basestocks, such as an ester, a polyalkylene glycol or an alkylated aromatic, as a co-base for additive solubility. A detailed description of suitable Group V basestocks can be found in "Synthetics, Mineral Oils and Bio-Based Lubricants, Chemistry and Technology" Edited by L. R. Rudnick, published by CRC Press, Taylor & Francis, 2005. The esters of choice are dibasic esters (such as adipate ester, ditridecyl adipate), mono-basic esters, polyol esters, including pentherythyol (TMP esters), and phthalate esters. The alkylated aromatics of choice are alkylbenzene, alkylated naphthalene and other alkylated aromatics such as alkylated diphenylether, diphenylsulfide, biphenyl, and the like.

Groups I, II, III, IV and V are broad categories of base oil stocks developed and defined by the American Petroleum Institute (API Publication 1509; www.API.org) to create guidelines for lubricant base oils. Group I basestocks generally have a viscosity index of between 80 to 120 and contain greater than 0.03% sulfur and/or less than 90% saturates. Group II basestocks generally have a viscosity index of between 80 to 120, and contain less than or equal to 0.03% sulfur and greater than or equal to 90% saturates. Group III stock generally has a viscosity index greater than 120 and contains less than or equal to 0.03% sulfur and greater than 90% saturates. Group IV includes polyalphaolefins (PAO). Group V basestocks include basestocks not included in Groups I-IV. Table 1 summarizes properties of each of these five groups. All discussion of Group I to V basestocks can be found in "Synthetics, Mineral Oils and Bio-Based Lubricants, Chemistry and Technology" Edited by L. R. Rudnick, published by CRC Press, Taylor & Francis, 2005.

Group VI in Table 1 are polyinternal olefins ("PIO"). Polyinternal olefins are long-chain hydrocarbons, typically a linear backbone with some branching randomly attached; they are obtained by oligomerization of internal n-olefins. The catalyst is usually a $BF_3$ complex with a proton source that leads to a cationic polymerization, or promoted $BF_3$ or $AlCl_3$ catalyst system. The process to produce polyinternal olefins (PIO) consists of four steps: reaction, neutralization/washing, hydrogenation and distillation. These steps are somewhat similar to PAO process. PIO are typically available in low viscosity grades, 4 cSt, 6 cSt and 8 cSt. If necessary, low viscosity, 1.5 to 3.9 cSt can also be made conveniently by the $BF_3$ process or other cationic processes. Typically, the n-olefins used as starting material are n-$C_{12}$-$C_{18}$ internal olefins, more preferably, n-$C_{14}$-$C_{16}$ olefins are used. PIO can be made with VI and pour points very similar to PAO, only slightly inferior. They can be used in engine and industrial lubricant formulations. For more detailed discussion, see Chapter 2, Polyinternalolefins in the book, "Synthetics, Mineral Oils, and Bio-Based Lubricants—Chemistry and Technology" Edited by Leslie R. Rudnick, p. 37-46, published by CRC Press, Taylor & Francis Group, 2006; or "Polyinternal Olefins" by Corsico, G.; Mattei, L.; Roselli, A.; Gommellini, Carlo. EURON, Milan, Italy. Chemical Industries (Dekker) (1999), 77 (Synthetic Lubricants and High-Performance Functional Fluids, (2nd Edition)), 53-62. Publisher: Marcel Dekker, Inc. PIO was classified by itself as Group VI fluid in API basestock classification.

TABLE 1

| | Basestock Properties | | |
|---|---|---|---|
| | Saturates | Sulfur | Viscosity Index |
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | Includes polyalphaolefins (PAO) | | |
| Group V | All other base oil stocks not included in Groups I, II, III or IV | | |
| Group VI | Polyinternal olefins (PIO) | | |

In an embodiment, the Group IV PAOs of this disclosure can be an oligomerization or polymerization product of one or more allylic vinyl terminated macromers (VTMs) having a molecular weight from 84 to 10080. The one or more allylic VTMs are oligomerized or polymerized in the presence of a catalyst under oligomerization or polymerization conditions sufficient to give the PAO. The catalyst can be a metallocene catalyst or an acid catalyst, e.g., Lewis acid. The one or more allylic vinyl terminated macromers (VTMs) preferably comprise one or more allylic vinyl terminated atactic polypropylene macromers (VTM aPP) having a molecular weight from 84 to 2250 and having a terminal allylic vinyl olefin content of at least 90%.

In another embodiment, the Group IV PAOs of this disclosure can be an oligomerization or polymerization product of one or more vinyl terminated macromers (VTMs). The one or more vinyl terminated macromers (VTMs) are oligomerized or polymerized in the presence of a catalyst under oligomerization or polymerization conditions sufficient to give the PAO. The one or more VTMs are produced by the oligomerization of an alpha-olefin feed. The alpha-olefin feed comprises ethylene/alpha-olefin monomers or propylene/alpha-olefin monomers. The catalyst can be a metallocene catalyst or an acid catalyst, e.g., Lewis acid.

In another embodiment, the Group IV PAOs of this disclosure can be a co-oligomerization or co-polymerization product of one or more allylic vinyl terminated macromers (VTMs) having a molecular weight from 84 to 10080, and one or more alpha-olefins. The one or more allylic VTMs and the one or more alpha-olefins are co-oligomerized or co-polymerized in the presence of a catalyst under co-oligomerization or co-polymerization conditions sufficient to give the composition. The one or more allylic vinyl terminated macromers (VTMs) preferably comprise one or more allylic vinyl terminated atactic polypropylene macromers (VTM aPP) having a molecular weight from 84 to 2250 and having a terminal allylic vinyl olefin content of at least 90%.

In another embodiment, the Group IV PAOs of this disclosure can be one or more vinyl terminated macromers (VTMs) having a molecular weight from 84 to 10080.

In another embodiment, the Group IV PAOs of this disclosure can be one or more allylic vinyl terminated atactic polypropylene macromers (VTM aPPs) having a molecular weight from 84 to 2520 and having a terminal allylic vinyl olefin content of at least 90%.

In another embodiment, the Group IV PAOs of this disclosure can have a viscosity ($Kv_{100}$) from 10 to 900 cSt at 100° C.; a viscosity index (VI) greater than 20; and a pour point (PP) less than 0° C.

The Group IV PAOs produced in accordance with the processes of this disclosure can possess high viscosity, low pour points and superior oxidative stability, shear stability, and low temperature properties. Furthermore, the high viscosity, Group IV PAOs of this disclosure can have low Bromine Number (low residual double bonds or unsaturation) and no crystalline peak but only low glass-transition temperature peak as measured by differential scanning calorimetry (DSC).

The Group IV PAOs of this disclosure have an high viscosity ($Kv_{100}$) from 300 to 900 cSt at 100° C., preferably from 350 to 850 cSt at 100° C., and more preferably from 400 to 800 cSt at 100° C. The Group IV PAOs have a viscosity index (VI) greater than 250, preferably greater than 275, and more preferably greater than 300. As used herein, viscosity ($Kv_{100}$) is determined by ASTM D 445-01, and viscosity index (VI) is determined by ASTM D 2270-93 (1998).

In another embodiment according to the present disclosure, any Group IV PAOs described herein may have a kinematic viscosity (Kv) at 10° C. in any of the following ranges: from 100 to 1,000 cSt, from 250 to 950 cSt, from 300 cSt to 900 cSt, from 400 cSt to 800 cSt, wherein all values are measured by ASTM D 445-01.

The Group IV PAOs of this disclosure have a high viscosity index and a $Kv_{100}$ of 300 cSt or more, alternatively 350 cSt or more, alternatively 400 cSt or more, up to 900 cSt, with a VI of 250 or more, alternatively 270 or more, alternatively 300 or more. Usually basestock VI is a function of fluid viscosity. Usually, the higher the VI, the better it is for lube application. Basestock VI also depends on feed composition. Fluids made from single 1-octene, 1-nonene, 1-decene, or 1-dodecene have excellent VI and good low pour point. Fluids made from two or more olefins selected from $C_8$ to $C_{12}$ alphaolefins generally have excellent high VI and superior low pour points if the average carbon chain length of feed LAOs is kept within 8 to 12 carbons. A relatively much lower average chain length in the feed (much below 6 carbons) of the mixed LAO would result in lower VI. Too high of a average chain length in the feed (much above 12 carbons) of the mixed LAO would result in very high pour point, around room temperature.

In another embodiment according to the present disclosure, any Group IV PAOs described herein has a viscosity index (VI) of 200 or more, or 260 or more, or 270 or more; alternatively, from 250 to 450, alternatively from 260 to 400, alternatively from 270 to 300, alternatively the viscosity index is at least 250, alternatively at least 260, alternatively at least 270. Viscosity index is determined according to ASTM Method D2270-93 [1998].

The Group IV PAOs produced in accordance with the processes of this disclosure have low pour points (PP) less than 0° C., preferably less than −30° C., and more preferably less than −35° C. As used herein, pour point is determined by ASTM D97.

In an embodiment of this disclosure, any Group IV PAOs described herein may have a pour point of less than −25° C. (as measured by ASTM D97), preferably less than −35° C., preferably less than −45° C., preferably less than −55° C., preferably less than −65° C. and preferably between −25° C. and −75° C.

The Group IV PAOs produced in accordance with the process of this disclosure have a narrow molecular weight distribution (Mw/Mn) less than 2.0, preferably less than 1.95, and more preferably less than 1.9 as synthesized. As used herein, molecular weight distribution (Mw/Mn) is determined by GPC using a column for medium to low molecular weight polymers, tetrahydrofuran as solvent and polystyrene as calibration standard.

The Group IV PAOs of this disclosure have a Mw of 100,000 g/mol or less, or between 2000 and 80,000 g/mol, or between 2500 and 60,000 g/mol, or between 2800 and 50,000 g/mol, or between 3360 and 40,000 g/mol. Preferred Mw's include those from 840 to 55,100 g/mol, or from 900 to 45,000 g/mol, or 1000 to 40,000 g/mol, or 2,000 to 37,500 g/mol. Alternatively preferred Mw's include 2240 to 67900 g/mol and 2240 to 37200 g/mol.

The Group IV PAOs of this disclosure preferably have an Mn of 50,000 g/mol or less, or 40,000 g/mol or less, or between 2000 and 40,000 g/mol, or between 2500 and 30,000 g/mol, preferably between 5000 and 20,000 g/mol. Preferred Mn ranges include those from 2800 to 10,000 g/mol or from 2800 to 8,000 g/mol. Alternatively preferred Mn ranges are from 2000 to 20,900 g/mol, or 2800 to 20,000 g/mol, or 2000 to 17000 g/mol, or 2000 to 12000 g/mol, or 2800 to 29000 g/mol, or 2800 to 17000 g/mol, or 2000 to 5000 g/mol.

The Mw and Mn are measured by GPC using a column for medium to low molecular weight polymers, tetrahydrofuran as solvent and polystyrene as calibration standard, correlated with the fluid viscosity according to a power equation.

In another embodiment, the Group IV PAOs described herein have a narrow molecular weight distribution of greater than 1 and less than 2, alternatively less than 1.95, alternatively less than 1.90, alternatively less than 1.85. The Mn and Mw are measured by gel permeation chromatography (GPC) using a column for medium to low molecular weight polymers, tetrahydrofuran as solvent and narrow molecular weight distribution polystyrene as calibration standard, correlated with the fluid viscosity according to a power equation. The MWD of Group IV PAOs is a function of fluid viscosity. Alternatively any of the polyalphaolefins described herein preferably have an Mw/Mn of between 1 and 2.0, alternatively between 1 and 1.95, depending on fluid viscosity.

The Group IV PAOs produced in accordance with the process of this disclosure have low residual unsaturation (Bromine Number) less than 2.0, preferably less than 1.75, and more preferably less than 1.5, as synthesized As used herein, Bromine Number is determined by ASTM D1159.

The Group IV PAOs of this disclosure comprise polymers of one or more $C_8$ to $C_{12}$ alphaolefins having an as-polymerized Bromine Number of less than 2, preferably between 0.2 to 1.6. The "as-polymerized" Bromine Number is the Bromine Number of the material exiting the polymerization reactor.

In a preferred embodiment, the Bromine Number of the Group IV PAOs of this disclosure are less than 2 or more preferably less than 1.5. Lower Bromine Number indicates higher degree of saturation, which is usually indicative of higher oxidative stability and high quality of basestock. Bromine Number is measured by ASTM D1159.

In another embodiment, any of the Group IV PAOs produced herein preferably have a Bromine Number of 1.8 or less as measured by ASTM D 1159, preferably 1.7 or less, preferably 1.6 or less, preferably 1.5 or less, preferably 1.4 or less, preferably 1.3 or less, preferably 1.2 or less, preferably 1.1 or less, preferably 1.0 or less, preferably 0.5 or less, preferably 0.1 or less.

The Group IV PAOs produced in accordance with the process of this disclosure have low glass transition temperature T, less than −60° C., preferably less than −70° C., and more preferably less than −80° C. As used herein, glass transition temperature $T_g$ is determined by differential scanning calorimetry (DSC). The polyolefin products produced in accordance with the process of this disclosure have no crystallization peak as measured by differential scanning calorimetry and high thermal stability.

The Group IV PAOs produced in accordance with the process of this disclosure can be produced at very high productivity greater than 50,000 g lube/g of catalyst, preferably greater than 60,000 g lube/g of catalyst, and more preferably greater than 70,000 g lube/g of catalyst. Alternatively, the productivity of the process described herein is typically greater than 200 kg of PAO per gram of transition metal compound, alternatively greater than 250 kg of transition metal compound, alternatively greater than 500 kg/g of transition metal compound, alternatively greater than 1000 g/g of transition metal compound, and/or greater than 10 kg of PAO per gram of initiator, alternatively greater than 50 kg/g of initiator, alternatively greater than 100 kg/g of initiator, alternatively greater than 500 kg/g of initiator.

A "vinyl terminated macromonomer," as used herein, refers to one or more of:
(i) a vinyl terminated polymer having at least 5% allyl chain ends (preferably 15%, 20%, 30%, 40%, 50%, 60%, 70%, 80%, 90%, 95%, 98%, or 99%);
(ii) a vinyl terminated polymer having an Mn of at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;
(iii) a copolymer having an Mn of 300 g/mol or more (measured by $^1$H NMR) comprising (a) from 20 mol % to 99.9 mol % of at least one $C_5$ to $C_{40}$ higher olefin, and (b) from 0.1 mol % to 80 mol % of propylene, wherein the higher olefin copolymer has at least 40% allyl chain ends;
(iv) a copolymer having an Mn of 300 g/mol or more (measured by $^1$H NMR), and comprises (a) from 80 mol % to 99.9 mol % of at least one $C_4$ olefin, (b) from 0.1 mol % to 20 mol % of propylene; and wherein the vinyl terminated macromonomer has at least 40% allyl chain ends relative to total unsaturation;
(v) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;
(vi) a propylene oligomer, comprising more than 90 mol % propylene and less than 10 mol % ethylene wherein the oligomer has: at least 93% allyl chain ends, a number average molecular weight (Mn) of 500 g/mol to 20,000 g/mol, an isobutyl chain end to allylic vinyl group ratio of 0.8:1 to 1.35:1.0, and less than 100 ppm aluminum;
(vii) a propylene oligomer, comprising: at least 50 mol % propylene and from 10 mol % to 50 mol % ethylene, wherein the oligomer has: at least 90% allyl chain ends, an Mn of 150 g/mol to 10,000 g/mol, and an isobutyl chain end to allylic vinyl group ratio of 0.8:1 to 1.2:1.0, wherein monomers having four or more carbon atoms are present at from 0 mol % to 3 mol %;
(viii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an Mn of 150 g/mol to 10,000 g/mol, and an isobutyl chain end to allylic vinyl group ratio of 0.8:1 to 1.35:1.0;
(ix) a propylene oligomer, comprising: at least 50 mol % propylene, from 0.1 mol % to 45 mol % ethylene, and from 0.1 mol % to 5 mol % diene, wherein the oligomer has: at least 90% allyl chain ends, an Mn of 150 g/mol to 10,000 g/mol, and an isobutyl chain end to allylic vinyl group ratio of 0.7:1 to 1.35:1.0; and
(x) a homo-oligomer, comprising propylene, wherein the oligomer has: at least 93% allyl chain ends, an Mn of 500 g/mol to 20,000 g/mol, an isobutyl chain end to allylic vinyl group ratio of 0.8:1 to 1.2:1.0, and less than 1400 ppm aluminum.

In some embodiments, the vinyl terminated macromonomer has an Mn of at least 200 g/mol, (e.g., 200 g/mol to 100,000 g/mol, e.g., 200 g/mol to 75,000 g/mol, e.g., 200 g/mol to 60,000 g/mol, e.g., 300 g/mol to 60,000 g/mol, or e.g., 750 g/mol to 30,000 g/mol) (measured by $^1$H NMR) and comprise one or more (e.g., two or more, three or more, four or more, and the like) $C_4$ to $C_{40}$ (e.g., $C_4$ to $C_{30}$, $C_4$ to $C_{20}$, or $C_4$ to $C_{12}$, e.g., butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) olefin derived units, where the vinyl terminated macromonomer comprises substantially no propylene derived units (e.g., less than 0.1 wt % propylene, e.g., 0 wt %); and wherein the vinyl terminated macromonomer has at least 5% (at least 10%, at least 15%, at least 20%, at least 30%, at least 40%, at least 50%, at least 60%, at least 70%; at least 80%, at least 90%, or at least 95%) allyl chain ends (relative to total unsaturation); and optionally, an allyl chain end to vinylidene chain end ratio of 1:1 or greater (e.g., greater than 2:1, greater than 2.5:1, greater than 3:1, greater than 5:1, or greater than 10:1); and even further optionally, e.g., substantially no isobutyl chain ends (e.g., less than 0.1 wt % isobutyl chain ends). In some embodiments, the vinyl terminated macromonomers may also comprise ethylene derived units, e.g., at least 5 mol % ethylene (e.g., at least 15 mol % ethylene, e.g., at least 25 mol % ethylene, e.g., at least 35 mol % ethylene, e.g., at least 45 mol % ethylene, e.g., at least 60 mol % ethylene, e.g., at least 75 mol % ethylene, or e.g., at least 90 mol % ethylene). Such vinyl terminated macromonomers are further described in U.S. Ser. No. 13/072,288, which is hereby incorporated by reference.

In some embodiments, the vinyl terminated macromonomers may have an Mn (measured by $^1$H NMR) of greater than 200 g/mol (e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprise:
(a) from 20 mol % to 99.9 mol % (e.g., from 25 mol % to 90 mol %, from 30 mol % to 85 mol %, from 35 mol % to 80 mol %, from 40 mol % to 75 mol %, or from 50 mol % to 95 mol %) of at least one $C_5$ to $C_{40}$ (e.g., $C_6$ to $C_{20}$) higher olefin; and
(b) from 0.1 mol % to 80 mol % (e.g., from 5 mol % to 70 mol %, from 10 mol % to 65 mol %, from 15 mol % to 55 mol %, from 25 mol % to 50 mol %, or from 30 mol % to 80 mol %) of propylene;
wherein the vinyl terminated macromonomer has at least 40% allyl chain ends (e.g., at least 50% allyl chain ends, at least 60% allyl chain ends, at least 70% allyl chain ends, or at least 80% allyl chain ends, at least 90% allyl chain ends, at least 95% allyl chain ends) relative to total unsaturation; and, optionally, an isobutyl chain end to allyl chain end ratio of less than 0.70:1, less than 0.65:1, less than 0.60:1, less than 0.50:1, or less than 0.25:1; and further optionally, an allyl chain end to vinylidene chain end ratio of greater than 2:1 (e.g., greater than 2.5:1, greater than 3:1, greater than 5:1, or greater than 10:1); and even further optionally, an allyl chain end to vinylene ratio is greater than 1:1 (e.g., greater than 2:1 or greater than 5:1). Such macromonomers are further described in U.S. Ser. No. 13/072,249, hereby incorporated by reference.

In another embodiment, the vinyl terminated macromonomer has an Mn of 300 g/mol or more (measured by $^1$H NMR, e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprises:
(a) from 80 mol % to 99.9 mol % of at least one $C_4$ olefin, e.g., 85 mol % to 99.9 mol %, e.g., 90 mol % to 99.9 mol %;
(b) from 0.1 mol % to 20 mol % of propylene, e.g., 0.1 mol % to 15 mol %, e.g., 0.1 mol % to 10 mol %; and
wherein the vinyl terminated macromonomer has at least 40% allyl chain ends (e.g., at least 50% allyl chain ends, at least 60% allyl chain ends, at least 70% allyl chain ends, or at least 80% allyl chain ends, at least 90% allyl chain ends, at least 95% allyl chain ends) relative to total unsaturation, and in some embodiments, an isobutyl chain end to allyl chain end ratio of less than 0.70:1, less than 0.65:1, less than 0.60:1, less than 0.50:1, or less than 0.25:1, and in further embodiments, an allyl chain end to vinylidene group ratio of more than 2:1, more than 2.5:1, more than 3:1, more than 5:1, or more than 10:1. Such macromonomers are also further described in U.S. Ser. No. 13/072,249, which is hereby incorporated by reference.

In other embodiments, the vinyl terminated macromonomer is a propylene co-oligomer having an Mn of 300 g/mol to 30,000 g/mol as measured by $^1$H NMR (e.g., 400 g/mol to 20,000 g/mol, e.g., 500 g/mol to 15,000 g/mol, e.g., 600 g/mol to 12,000 g/mol, e.g., 800 g/mol to 10,000 g/mol, e.g., 900 g/mol to 8,000 g/mol, e.g., 900 g/mol to 7,000 g/mol), comprising 10 mol % to 90 mol % propylene (e.g., 15 mol % to 85 mol %, e.g., 20 mol % to 80 mol %, e.g., 30 mol % to 75 mol %, e.g., 50 mol % to 90 mol %) and 10 mol % to 90 mol % (e.g., 85 mol % to 15 mol %, e.g., 20 mol % to 80 mol %, e.g., 25 mol % to 70 mol %, e.g., 10 mol % to 50 mol %) of one or more alpha-olefin comonomers (e.g., ethylene, butene, hexene, or octene, e.g., ethylene), wherein the oligomer has at least X % allyl chain ends (relative to total unsaturations), where: 1) X=(−0.94 (mol % ethylene incorporated)+100 (alternately 1.20 (−0.94 (mol % ethylene incorporated)+100), alternately 1.50 (−0.94 (mol % ethylene incorporated)+100))), when 10 mol % to 60 mol % ethylene is present in the co-oligomer, 2) X=45 (alternately 50, alternately 60), when greater than 60 mol % and less than 70 mol % ethylene is present in the co-oligomer, and 3) X=(1.83*(mol % ethylene incorporated)−83, {alternately 1.20 [1.83*(mol % ethylene incorporated)−83], alternately 1.50 [1.83*(mol % ethylene incorporated)−83]})), when 70 mol % to 90 mol % ethylene is present in the co-oligomer. Such macromonomers are further described in U.S. Ser. No. 12/143,663, which is hereby incorporated by reference.

In other embodiments, the vinyl terminated macromonomer is a propylene oligomer, comprising more than 90 mol % propylene (e.g., 95 mol % to 99 mol %, e.g., 98 mol % to 9 mol %) and less than 10 mol % ethylene (e.g., 1 mol % to 4 mol %, e.g., 1 mol % to 2 mol %), wherein the oligomer has: at least 93% allyl chain ends (e.g., at least 95%, e.g., at least 97%, e.g., at least 98%); a number average molecular weight (Mn) of 400 g/mol to 30,000 g/mol, as measured by $^1$H NMR (e.g., 500 g/mol to 20,000 g/mol, e.g., 600 g/mol to 15,000 g/mol, e.g., 700 g/mol to 10,000 g/mol, e.g., 800 g/mol to 9,000 g/mol, e.g., 900 g/mol to 8,000 g/mol, e.g., 1,000 g/mol to 6,000 g/mol); an isobutyl chain end to allylic vinyl group ratio of 0.8:1 to 1.35:1.0, and less than 1400 ppm aluminum, (e.g., less than 1200 ppm, e.g., less than 1000 ppm, e.g., less than 500 ppm, e.g., less than 100 ppm). Such macromonomers are further described in U.S. Ser. No. 12/143,663.

In other embodiments, the vinyl terminated macromonomer is a propylene oligomer, comprising: at least 50 mol % (e.g., 60 mol % to 90 mol %, e.g., 70 mol % to 90 mol %) propylene and from 10 mol % to 50 mol % (e.g., 10 mol % to 40 mol %, e.g., 10 mol % to 30 mol %) ethylene, wherein the oligomer has: at least 90% allyl chain ends (e.g., at least 91%, e.g., at least 93%, e.g., at least 95%, e.g., at least 98%); an Mn of 150 g/mol to 20,000 g/mol, as measured by $^1$H NMR (e.g., 200 g/mol to 15,000 g/mol, e.g., 250 g/mol to 15,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.8:1 to 1.3:1.0, wherein monomers having four or more carbon atoms are present at from 0 mol % to 3 mol % (e.g., at less than 1 mol %. e.g., less than 0.5 mol %, e.g., at 0 mol %). Such macromonomers are further described in U.S. Ser. No. 12/143,663.

In other embodiments, the vinyl terminated macromonomer is a propylene oligomer, comprising: at least 50 mol %

(e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %. e.g., 0.5 mol % to 1 mol %) $C_4$ to $C_{12}$ olefin (such as butene, hexene, or octene, e.g., butene), wherein the oligomer has: at least 90% allyl chain ends (e.g., at least 91%, e.g., at least 93%, e.g., at least 95%, e.g., at least 98%); a number average molecular weight (Mn) of 150 g/mol to 15,000 g/mol, as measured by $^1$H NMR (e.g., 200 g/mol to 12,000 g/mol, e.g., 250 g/mol to 10,000 g/mol, e.g., 300 g/mol to 10,000 g/mol, e.g., 400 g/mol to 9500 g/mol, e.g., 500 g/mol to 9,000 g/mol, e.g., 750 g/mol to 9,000 g/mol); and an isobutyl chain end to allylic vinyl group ratio of 0.8:1 to 1.35:1.0. Such macromonomers are further described in U.S. Ser. No. 12/143,663.

In other embodiments, the vinyl terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %. e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the oligomer has at least 90% allyl chain ends (e.g., at least 91%, e.g., at least 93%, e.g., at least 95%, e.g., at least 98%); a number average molecular weight (Mn) of 150 g/mol to 20,000 g/mol, as measured by $^1$H NMR (e.g., 200 g/mol to 15,000 g/mol, e.g., 250 g/mol to 12,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.7:1 to 1.35:1.0. Such macromonomers are further described in U.S. Ser. No. 12/143,663.

In other embodiments, the vinyl terminated macromonomer is a propylene homo-oligomer, comprising propylene and less than 0.5 wt % comonomer, e.g., 0 wt % comonomer, wherein the oligomer has:
i) at least 93% allyl chain ends (e.g., at least 95%, e.g., at least 96%, e.g., at least 97%, e.g., at least 98%, e.g., at least 99%);
ii) a number average molecular weight (Mn) of 500 g/mol to 20,000 g/mol, as measured by $^1$H NMR (e.g., 500 g/mol to 15,000 g/mol, e.g., 700 g/mol to 10,000 g/mol, e.g., 800 g/mol to 8,000 g/mol, e.g., 900 g/mol to 7,000 g/mol, e.g., 1,000 g/mol to 6,000 g/mol, e.g., 1,000 g/mol to 5,000 g/mol);
iii) an isobutyl chain end to allylic vinyl group ratio of 0.8:1 to 1.3:1.0; and
iv) less than 1400 ppm aluminum, (e.g., less than 1200 ppm, e.g., less than 1000 ppm, e.g., less than 500 ppm, e.g., less than 100 ppm). Such macromonomers are also further described in U.S. Ser. No. 12/143,663.

The vinyl terminated macromonomers may be homopolymers, copolymers, terpolymers, and so on. Any vinyl terminated macromonomers described herein has one or more of:
(i) an isobutyl chain end to allylic vinyl group ratio of 0.8:1 to 1.3:1.0;
(ii) an allyl chain end to vinylidene chain end ratio of greater than 2:1 (e.g., greater than 2.5:1, greater than 3:1, greater than 5:1, or greater than 10:1);
(iii) an allyl chain end to vinylene ratio is greater than 1:1 (e.g., greater than 2:1 or greater than 5:1); and
(iv) at least 5% allyl chain ends (preferably 15%, 20%, 30%, 40%, 50%, 60%, 70%, 80%, 90%, 95%, 98%, or 99%).

Vinyl terminated macromonomers generally have a saturated chain end (or terminus) and/or an unsaturated chain end or terminus. The unsaturated chain end of the vinyl terminated macromonomer comprises an "allyl chain end" or a "3-alkyl" chain end. An allyl chain end is represented by $CH_2CH$—$CH_2$—, as shown in the formula:

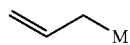

where M represents the polymer chain. "Allylic vinyl group," "allyl chain end," "vinyl chain end," "vinyl termination," "allylic vinyl group," and "vinyl terminated" are used interchangeably in the following description. The number of allyl chain ends, vinylidene chain ends, vinylene chain ends, and other unsaturated chain ends is determined using $^1$H NMR at 120° C. using deuterated tetrachloroethane as the solvent on an at least 250 MHz NMR spectrometer, and in selected cases, confirmed by $^{13}$C NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a BRUKER spectrometer operating at 500 MHz for proton and 125 MHz for carbon) for vinyl terminated oligomers in *J American Chemical Soc.*, 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

A 3-alkyl chain end (where the alkyl is a $C_1$ to $C_{38}$ alkyl), also referred to as a "3-alkyl vinyl end group" or a "3-alkyl vinyl termination", is represented by the formula:

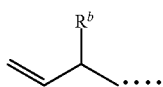

3-alkyl vinyl end group where "••••" represents the polyolefin chain and $R^b$ is a $C_1$ to $C_{38}$ alkyl group, or a $C_1$ to $C_{20}$ alkyl group, such as methyl, ethyl, propyl, butyl, pentyl, hexyl, heptyl, octyl, nonyl, decyl, undecyl, dodecyl, and the like. The amount of 3-alkyl chain ends is determined using $^{13}$C NMR as set out below.

$^{13}$C NMR data is collected at 120° C. at a frequency of at least 100 MHz, using a BRUKER 400 MHz NMR spectrometer. A 90 degree pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra is acquired with time averaging to provide a signal to noise level adequate to measure the signals of interest. Samples are dissolved in tetrachloroethane-$d_2$ at concentrations between 10 wt % to 15 wt % prior to being inserted into the spectrometer magnet. Prior to data analysis spectra are referenced by setting the chemical shift of the TCE solvent signal to 74.39 ppm. Chain ends for quantization were identified using the signals shown in the table below. N-butyl and n-propyl were not reported due to their low abundance (less than 5%) relative to the chain ends shown in the table below.

| Chain End | $^{13}$C NMR Chemical Shift |
|---|---|
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

The "allyl chain end to vinylidene chain end ratio" is defined to be the ratio of the percentage of allyl chain ends to the percentage of vinylidene chain ends. The "allyl chain end to vinylene chain end ratio" is defined to be the ratio of the percentage of allyl chain ends to the percentage of vinylene chain ends. Vinyl terminated macromonomers typically also have a saturated chain end. In polymerizations where propylene is present, the polymer chain may initiate growth in a propylene monomer, thereby generating an isobutyl chain end. An "isobutyl chain end" is defined to be an end or terminus of a polymer, represented as shown in the formula below:

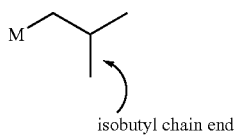

isobutyl chain end where M represents the polymer chain. Isobutyl chain ends are determined according to the procedure set out in WO 2009/155471. The "isobutyl chain end to allylic vinyl group ratio" is defined to be the ratio of the percentage of isobutyl chain ends to the percentage of allyl chain ends.

In polymerizations comprising $C_4$ or greater monomers (or "higher olefin" monomers), the saturated chain end may be a $C_4$ or greater (or "higher olefin") chain end, as shown in the formula below:

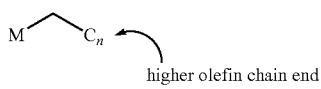

higher olefin chain end where M represents the polymer chain and n is an integer selected from 4 to 40. This is especially true when there is substantially no ethylene or propylene in the polymerization. In an ethylene/($C_4$ or greater monomer) copolymerization, the polymer chain may initiate growth in an ethylene monomer, thereby generating a saturated chain end which is an ethyl chain end. Mn ($^1$H NMR) is determined according to the following NMR method. $^1$H NMR data is collected at either room temperature or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 MHz is used). Data are recorded using a maximum pulse width of 45° C., 8 seconds between pulses and signal averaging 120 transients. Spectral signals are integrated and the number of unsaturation types per 1000 carbons is calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

Mn may also be determined using a GPC-DRI method, as described below. For the purpose of the claims, Mn is determined by $^1$H NMR. Mn, Mw, and Mz may be measured by using a Gel Permeation Chromatography (GPC) method using a High Temperature Size Exclusion Chromatograph (SEC, either from Waters Corporation or Polymer Laboratories), equipped with a differential refractive index detector (DRI). Experimental details, are described in: T. Sun, P. Brant, R. R. Chance, and W. W. Graessley, *Macromolecules*, Volume 34, Number 19, pp. 6812-6820, (2001) and references therein. Three Polymer Laboratories PLgel 10 mm Mixed-B columns are used. The nominal flow rate is 0.5 cm$^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4-trichlorobenzene (TCB). The TCB mixture is then filtered through a 0.7 μm glass pre-filter and subsequently through a 0.1 m Teflon filter. The TCB is then degassed with an online degasser before entering the SEC. Polymer solutions are prepared by placing dry polymer in a glass container, adding the desired amount of TCB, then heating the mixture at 160° C. with continuous agitation for 2 hours. All quantities are measured gravimetrically. The TCB densities used to express the polymer concentration in mass/volume units are 1.463 g/mL at room temperature and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this disclosure and the claims thereto, (dn/dc)=0.104 for propylene polymers and ethylene polymers, and 0.1 otherwise. Units of parameters used throughout this description of the SEC method are: concentration is expressed in g/cm$^3$, molecular weight is expressed in g/mol, and intrinsic viscosity is expressed in dL/g.

In an embodiment, the polyolefin is derived from a vinyl terminated propylene polymer. In an embodiment, the vinyl terminated propylene polymer is produced using a process comprising: contacting propylene, under polymerization conditions, with a catalyst system comprising an activator and at least one metallocene compound represented by the formula:

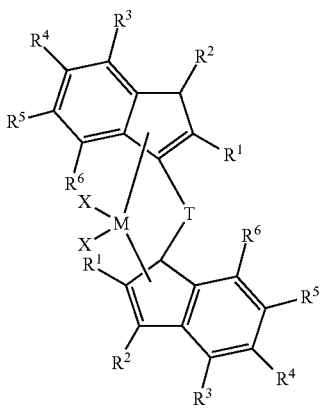

where:

M is hafnium or zirconium;

each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);

each $R^1$ is, independently, a $C_1$ to $C_{10}$ alkyl group;

each $R^2$ is, independently, a $C_1$ to $C_{10}$ alkyl group;

each $R^3$ is hydrogen;

each $R^4$, $R^5$, and $R^6$, is, independently, hydrogen or a substituted hydrocarbyl or unsubstituted hydrocarbyl group, or a heteroatom;

T is a bridging group; and further provided that any of adjacent $R^4$, $R^5$, and $R^6$ groups may form a fused ring or multicenter fused ring system where the rings may be aromatic, partially saturated or saturated; and obtaining a propylene polymer having at least 50% allyl chain ends (relative to total unsaturations), as described in co-pending U.S. Ser. No. 13/072,280, filed Mar. 25, 2011, which is incorporated by reference in its entirety herein.

In an embodiment, the vinyl terminated propylene polymer is produced using a process comprising:

1) contacting:

a) one or more olefins with

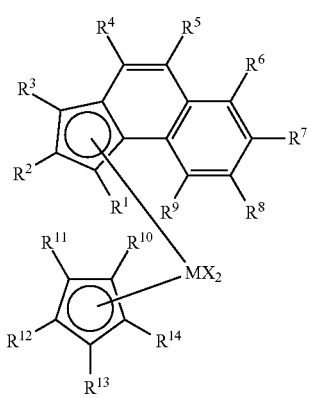

b) a transition metal catalyst compound represented by the formula:

wherein

M is hafnium or zirconium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;

each $R^1$ and $R^3$ are, independently, a $C_1$ to $C_8$ alkyl group; and each $R^2$, $R^4$, $R^5$, $R^6$, $R^7$, $R^8$, $R^9$, $R^{10}$, $R^{11}$, $R^{12}$, $R^{13}$, and $R^{14}$ are, independently, hydrogen, or a substituted or unsubstituted hydrocarbyl group having from 1 to 8 carbon atoms, provided however that at least three of the $R^{10}$-$R^{14}$ groups are not hydrogen; and 2) obtaining vinyl terminated polymer having an Mn of 300 g/mol or more and at least 30% allyl chain ends (relative to total unsaturation), as described in co-pending U.S. Ser. No. 13/072,279, filed Mar. 25, 2011, which is incorporated by reference in its entirety herein.

In an embodiment, the polyolefin chain is derived from a higher olefin copolymer comprising allyl chain ends. In an embodiment, the higher olefin copolymer comprising allyl chain ends has an Mn of 300 g/mol or more (measured by $^1$H NMR) comprising:

(i) from 20 to 99.9 mol % of at least one $C_5$ to $C_{40}$ higher olefin; and (ii) from 0.1 mol % to 80 mol % of propylene;

wherein the higher olefin copolymer has at least 40% allyl chain ends, as described in U.S. Ser. No. 13/072,249, filed Mar. 25, 2011, which is incorporated by reference in its entirety herein.

In an embodiment, the polyolefin chain is derived from a vinyl terminated branched polyolefin. In an embodiment, the vinyl terminated branched polyolefin has an Mn ($^1$H NMR) of 7,500 to 60,000 g/mol, comprising one or more alpha olefin derived units comprising ethylene and/or propylene, and having;

(i) 50% or greater allyl chain ends, relative to total number of unsaturated chain ends; and (ii) a $g'_{vis}$ of 0.90 or less, as described in U.S. Ser. No. 61/467,681, filed Mar. 25, 2011, which is incorporated by reference in its entirety herein.

In an embodiment, the polyolefin chain is derived from a vinyl terminated branched polyolefin produced by a process for polymerization, comprising:

(i) contacting, at a temperature greater than 35° C., one or more monomers comprising ethylene and/or propylene, with a catalyst system comprising a metallocene catalyst compound and an activator, wherein the metallocene catalyst compound is represented by the following formula:

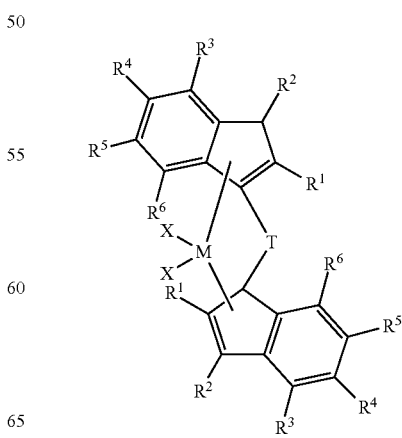

where: M is selected from the group consisting of zirconium or hafnium;

each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);

each $R^1$, $R^2$, $R^3$, $R^4$, $R^5$, and $R^6$, is, independently, hydrogen or a substituted or unsubstituted hydrocarbyl group, a heteroatom or heteroatom containing group;

further provided that any two adjacent R groups may form a fused ring or multicenter fused ring system where the rings may be aromatic, partially saturated or saturated;

further provided that any of adjacent $R^4$, $R^5$, and $R^6$ groups may form a fused ring or multicenter fused ring system where the rings may be aromatic, partially saturated or saturated;

T is a bridging group represented by the formula $(Ra)_2J$, where J is one or more of C, Si, Ge, N or P, and each Ra is, independently, hydrogen, halogen, $C_1$ to $C_{20}$ hydrocarbyl or a $C_1$ to $C_{20}$ substituted hydrocarbyl, provided that at least one $R^3$ is a substituted or unsubstituted phenyl group, if any of $R^1$, $R^2$, $R^4$, $R^5$, or $R^6$ are not hydrogen;

(ii) converting at least 50 mol % of the monomer to polyolefin; and (iii) obtaining a branched polyolefin having greater than 50% allyl chain ends, relative to total unsaturated chain ends and a Tm of 60° C. or more, as described in U.S. Ser. No. 61/467,681, filed Mar. 25, 2011, which is incorporated by reference in its entirety herein.

Besides using the polymers and/or oligomers of this disclosure as synthetic basestocks, they can be used for other applications. For example, higher molecular products can be used as bright stock or viscosity modification to replace PIB type molecules.

In accordance with this disclosure, the oligomerizations and polymerizations (including co-oligomerizations and co-polymerizations) of the allylic vinyl terminated polypropylene macromers can be carried out in the presence of a metallocene catalyst.

The oligomerizations and polymerizations employ metallocene catalysts together with one or more activators (such as an alumoxane or a non-coordinating anion) and optionally with co-activators such as trialkylaluminum compounds. The metallocene catalyst can be a bridged or unbridged, substituted or unsubstituted cyclopentadienyl, indenyl or fluorenyl compound. One preferred class of catalysts is highly substituted metallocenes that give high catalyst productivity and higher product viscosity. Another preferred class of metallocenes is bridged and substituted cyclopentadienes. Another preferred class of metallocenes is bridged and substituted indenes or fluorenes. One aspect of the processes described herein also includes treatment of the feed olefins to remove catalyst poisons, such as peroxides, oxygen, sulfur, nitrogen-containing organic compounds, and or acetylenic compounds. This treatment is believed to increase catalyst productivity, typically more than 5 fold, preferably more than 10 fold.

Illustrative metallocene catalysts and metallocene catalyzed oligomerizations and polymerizations are described, for example, in US 2008/0177121 A1 (2008); WO 2008/010862 A1 (2008); US 2009/0005279 A1 (2009); WO 2007011459 A1 (2007); US 2007/0043248 A1 (2007); WO 2007011973 A1 (2007); US 2009/0036725 A1 (2009); WO 2009/017953 A3 (2009); WO 2007/011832 A1 (2007); US 2008/0020928 A1 (2008); WO 2008010865 A1 (2008); US 2009/0221775 A1 (2009); WO 2009/097069 A1 (2009); US 2009/0247442 A1 (2009); WO 2009/123800 A1 (2009); US 2009/0240012 A1 (2009); WO 2009/117110 A3 (2009); all of which are incorporated herein by reference.

With regard to metallocene catalyzed oligomerizations and polymerizations, the process can be carried out over a wide range of temperatures and is carried out at a temperature sufficient to effect reaction. The temperature will preferably be 25° C. to 195° C., more preferably 55° C. to 175° C., and most preferably 95° C. to 165° C. The reaction can be carried out at a single temperature or, sequentially, at different temperatures.

The reaction can likewise be carried out over a wide range of pressures and is carried out at a pressure sufficient to effect reaction. The reaction pressure will preferably be 250 psi (1.72 MPa) or less and more preferably be 25 to 100 psi (0.17 to 0.69 MPa).

Inert gas, such as nitrogen, can be used to minimize oxidation of products during reaction and to allow operation at higher temperatures with oligomers or polymers of low boiling points. An atmosphere of nitrogen or other inert gas, in contrast to air, suppresses the formation of products that may deactivate the catalysts, particularly clay catalysts. Other benefits of nitrogen or other inert gas pressure include higher rates of reaction, shorter reaction times, and enhanced formation of dialkylated DPA. The loss of volatiles during reaction is reduced.

If desired, the reaction can be carried out in a neutral solvent such as mineral oil or an inert hydrocarbon solvent, but usually no solvent is necessary.

Reaction time is a very flexible reaction parameter and is dependent on the reaction temperature, mole ratio of reactants and catalysts, and pressure. The reaction will preferably be carried out over a period of 2 to 30 hours, more preferably over a period of 5 to 24 hours, and most preferably over a period of 6 to 16 hours.

Upon completion of the reaction, the desired metallocene catalyzed oligomerization and polymerization products can undergo filtration, stripping under vacuum, or separation by elution with hexane using column chromatography. The metallocene catalyzed oligomerization and polymerization products are preferably liquid at room temperature and atmospheric pressure.

In accordance with this disclosure, the oligomerizations and polymerizations (including co-oligomerizations and co-polymerizations) of the allylic vinyl terminated polypropylene macromers can be carried out in the presence of a catalyst of a Lewis acid. The Lewis acid catalysts useful for oligomerization or polymerization reactions include the metal and metalloid halides conventionally used as Friedel-Crafts catalysts. Suitable examples include $AlCl_3$, $BF_3$, $AlBr_3$, $TiCl_3$, and $TiCl_4$, either as such or with a protic promoter. Other examples include solid Lewis acid catalysts, such as synthetic or natural zeolites; acid clays; polymeric acidic resins; amorphous solid catalysts, such as silica-alumina; and heteropoly acids, such as the tungsten zirconates, tungsten molybdates, tungsten vanadates, phosphotungstates and molybdotungstovanadogermanates (e.g., $WO_x/ZrO_2$ and $WO_x/MoO_3$). Typically, the amount of acid catalyst used is 0.1 to 30 wt % and preferably 0.2 to 5 wt % based on total weight of the feed.

If boron trifluoride is used as the oligomerization or polymerization catalyst, it is desirable to use a protic promoter. Useful promoters include water; alcohols, such as the lower ($C_1$-$C_6$) alkanols, including ethanol, isopropanol, and butanol; acids, organic acids, such as carboxylic acid, acetic acid, propionic acid, and butanoic acid, or anhydrides thereof, such as acetic anhydride; inorganic acids, such as phosphoric acid as disclosed in U.S. Pat. No. 3,149,178; and esters, such as ethyl acetate as disclosed in U.S. Pat. No. 6,824,671, all of which are incorporated herein by reference in their entirety. Other protic promoters include alcohol alkoxylates, such as glycol ethers, e.g., ethylene glycol monomethyl ether (2-methoxyethanol), and propylene glycol monoethyl ether; ethoxylates derived from mixed $C_2$ to $C_{24}$ straight chain alcohols, such as those described in U.S. Pat. No. 5,068,487, which is incorporated herein by reference in its entirety; ethers, such as dimethyl ether, diethyl ether, and methyl ethyl ether; ketones; aldehydes; and alkyl halides. In the instance of boron trifluoride, the protic promoter forms a catalyst complex with the boron trifluoride, and it is the complex that serves as a catalyst for the oligomerization or polymerization. The complex usually contains an excess of boron trifluoride, which is adsorbed in the mixture thereof.

It is possible to use solvents or diluents in the Lewis acid catalyzed allylic vinyl terminated polypropylene macromers oligomerization or polymerization step (or cooligomerization or co-polymerization step), but if the catalyst system being used is a liquid, this may also function as the solvent or diluent for the reaction so that no additional solvent or diluent is required. Additional liquids that are non-reactive to the selected catalyst system may, however, be present if desired. For example, additional liquids may be added to control viscosity of the reaction mixture or to carry off heat of reaction by evaporation with reflux of the condensed vapor. Hydrocarbons, such as alkanes and aromatics, e.g., hexane and toluene, are suitable for this purpose.

Thus, the light vinyl terminated polypropylene macromers reactant, either as such or with additional alpha-olefin co-feed may be oligomerized or polymerized directly in the presence of the catalyst system with or without the addition of solvent or diluent. The reaction will preferably be carried out in a closed environment when gaseous catalysts such as boron trifluoride are used and preferably under inert atmosphere, e.g. nitrogen. The temperature of the Lewis acid-catalyzed oligomerization or polymerization reaction can vary in practical operation between −10° C. to 300° C. and preferably between 0° C. to 75° C. The system may operate under atmospheric pressure since the system typically exhibits low vapor pressures at the temperatures normally used for this process. It may, however, be operated under mild pressure if it is desired to maintain a closed reaction environment, e.g., under autogenously pressure. When using a solid Lewis acid as the catalyst, the oligomerization or polymerization will preferably be carried out using a fixed bed of the catalyst in a downflow mode, although alternative forms of operation, e.g., in a stirred tank reactor, are possible.

Following completion of the polymerization or oligomerization reaction. Lewis acid catalyst activity may be quenched by addition of water or a dilute aqueous base, such as 5 wt % NaOH solution. The organic layer may be separated and distilled to remove components other than the basestock. When a promoted $BF_3$ catalyst is used, the gaseous $BF_3$ and promoter may be recycled if not deactivated at the end of the reaction. When a solid catalyst is used, a simple filtration can be used to separate the catalyst from the oligomer or polymer product if the reaction has not been carried out in a fixed bed. The oligomer or polymer product may then be fractionated to remove any unreacted light olefin and the oligomer or polymer in the desired boiling range and can then be hydrogenated to remove residual unsaturation, if desired.

The Lewis acid catalyst used in the present oligomerization or polymerization process can comprises an ionic liquid. In general the amount of the ionic liquid used as catalyst is typically between 0.1 to 50 wt % and preferably between 0.2 to 5 wt % based on total amount of olefin feed. Most of the ionic liquids are salts (100% ions) with a melting point below 100° C. They typically exhibit no measurable vapor pressure below thermal decomposition. The properties of ionic liquids result from the composite properties of the wide variety of cations and anions which may be present in these liquids. Many of the ionic liquids are liquid over a wide temperature range (often more than 300° C.). They have low melting points (as low as −96° C. has been reported), which can be attributed to large asymmetric cations having low lattice energies. As a class of materials, ionic liquids are highly solvating for both organic and inorganic materials. Many of them are nonflammable, non-explosive and have high thermal stability. They are also recyclable, which can be helpful in reducing environmental concerns over their use.

The acidic ionic liquid oligomerization or polymerization catalyst system will usually be comprised of at least two components of which one is the ionic liquid. In most instances the catalyst system will be a two component system. The first component is an aluminum halide or an alkyl aluminum halide. For example, a typical first component of the catalyst may be aluminum trichloride. The second component is a quaternary ammonium, quaternary phosphonium, or tertiary sulfonium compound, such as, for example, a liquid salt selected from one or more of hydrocarbyl substituted ammonium halides, hydrocarbyl substituted imidazolium halide, hydrocarbyl substituted pyridinium halide, hydrocarbyl substituted phosphonium halide. For example, 1-ethyl-3-methylimidazolium chloride can be used as a second component.

The second component making up the catalyst is an ionic liquid which is primarily a salt or mixture of salts which melts below room temperature, as noted above. Ionic liquids may be characterized by the general formula $Q^+A^-$, where is $Q^+$ is quaternary ammonium, quaternary phosphonium or quaternary sulfonium, and $A^-$ is a negatively charged ion such as $Cl^-$, $Br^-$, $OCl_4^-$, $NO_3^-$, $BF_4^-$, $BCl_4^-$, $PF_6^-$, $SbF_6^-$, $AlCl_4^-$, $CuCl_2^-$, $FeCl_3^-$. The mole ratio of the two components of the catalyst system will be usually fall within the range of from 1:1 to 5:1 of the first component to the second component; more preferably the mole ratio will be in the range of from 1:1 to 2:1.

The typical compounds which may be used as the second component of the two component system are at least one selected from the group consisting of: 1-butyl-3-methylimidazolium hexafluorophosphate [bmim$^+$][PF$_6^-$], trihexyl (tetradecyl) phosphonium chloride [thtdPh$^+$][Cl$^-$], 1-ethyl-3-methylimidazolium methanesulfonate [emim$^+$][CH$_3$SO$_3^-$], 1-ethyl-3-methylimidazolium thiocyanate [emim$^+$][SCN$^-$], choline salicylate, 1-ethyl-3-methylimidazolium tetrachloroaluminate [emim$^+$][AlCl$_4^-$], 1-butyl-3-methylimidazolium hexafluorophosphate [bmim][PF$_6$—], hexyl-3-methylimidazolium dioctylsulfosuccinate [hmim][doss$^-$], 1-hexyl-3-methylimidazolium hexafluoroborate [hmim][BF$_4^-$], 1-hexyl-3-methylimidazolium hexafluorophosphate [hmim][PF$_6^-$], tetrabutyl ammonium dioctylsulfosuccinate [tbam][doss$^-$], tetrabutyl phosphonium dioctylsulfosuccinate [tbPh][doss$^-$], tributyl (tetradecyl) phosphonium dodecylbenzenesulfonate [tbtdPh][dbs$^-$], tributyl (tetradecyl) phosphonium methanesulfonate [tbtdPh][mes$^-$], trihexyl (tetradecyl) phosphonium bis(trifluoromethane) sulfonylimide [thtdPh][Tf$_2$N$^-$], trihexyl (tetradecyl) phosphonium chloride [thtdPh][Cl$^-$], trihexyl (tetradecyl) phosphonium decanoate [thtdPh][deca$^-$], trihexyl (tetradecyl) phosphonium dodecylbenzenesulfonate [thtdPh][dbs$^-$], and trihexyl (tetradecyl) phosphonium methanesulfonate [thtdPh][mes$^-$].

Following completion of the oligomerization or polymerization reaction, the organic layer containing polymer product and the unreacted low molecular weight feed is separated from the ionic liquid phase. The acidic ionic liquid catalyst that remains after recovery of the organic phase may be recycled to the oligomerization or polymerization reaction.

A wide range of lubricating oils is known in the art and may be used in mixture with the lubricating oil PAO basestocks of this disclosure. For example, lubricating oils that may be used with the PAOs of the present disclosure include natural oils and synthetic oils. Natural and synthetic oils (or mixtures thereof) can be used unrefined, refined, or rerefined (the latter is also known as reclaimed or reprocessed oil). Unrefined oils are those obtained directly from a natural or synthetic source and used without added purification. These include shale oil obtained directly from retorting operations, petroleum oil obtained directly from primary distillation, and ester oil obtained directly from an esterification process. Refined oils are similar to the oils discussed for unrefined oils except refined oils are subjected to one or more purification steps to improve the at least one lubricating oil property. One skilled in the art is familiar with many purification processes. These processes include solvent extraction, secondary distillation, acid extraction, base extraction, filtration, and percolation. Rerefined oils are obtained by processes analogous to refined oils but using an oil that has been previously used as a feed stock.

Natural oils include animal oils, vegetable oils (castor oil and lard oil, for example), and mineral oils. Animal and vegetable oils possessing favorable thermal oxidative stability can be used. Of the natural oils, mineral oils are preferred. Mineral oils vary widely as to their crude source, for example, as to whether they are paraffinic, naphthenic, or mixed paraffinic-naphthenic. Oils derived from coal or shale are also useful in the present disclosure. Natural oils vary also as to the method used for their production and purification, for example, their distillation range and whether they are straight run or cracked, hydrorefined, or solvent extracted.

Group II and/or Group III hydroprocessed or hydrocracked basestocks, as well as synthetic oils such as polyalphaolefins, alkyl aromatics and synthetic esters, i.e. Group IV and Group V oils are also well known basestock oils.

Synthetic oils include hydrocarbon oil such as polymerized and interpolymerized olefins (polybutylenes, polypropylenes, propylene isobutylene copolymers, ethylene-olefin copolymers, and ethylene-alphaolefin copolymers, for example). Conventional polyalphaolefin (PAO) oil basestocks, the Group IV API basestocks, may b mixed with the PAOs of this disclosure. By way of example, conventional PAOs derived from $C_8$, $C_{10}$, $C_{12}$, $C_{14}$ olefins or mixtures thereof may be utilized. See U.S. Pat. Nos. 4,956,122; 4,827,064; and 4,827,073, which are incorporated herein by reference in their entirety. Group IV oils, that is, the conventional PAO basestocks have viscosity indices preferably greater than 130, more preferably greater than 135, still more preferably greater than 140.

Esters in a minor amount may be useful in the PAO lubricating oils of this disclosure. Additive solvency and seal compatibility characteristics may be secured by the use of esters such as the esters of dibasic acids with monoalkanols and the polyol esters of monocarboxylic acids. Esters of the former type include, for example, the esters of dicarboxylic acids such as phthalic acid, succinic acid, sebacic acid, fumaric acid, adipic acid, linoleic acid dimer, malonic acid, alkyl malonic acid, alkenyl malonic acid, etc., with a variety of alcohols such as butyl alcohol, hexyl alcohol, dodecyl alcohol, 2-ethylhexyl alcohol, etc. Specific examples of these types of esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, etc.

Particularly useful synthetic esters are those which are obtained by reacting one or more polyhydric alcohols, preferably the hindered polyols such as the neopentyl polyols; e.g., neopentyl glycol, trimethylol ethane, 2-methyl-2-propyl-1,3-propanediol, trimethylol propane, pentaerythritol and dipentaerythritol with alkanoic acids containing at least 4 carbon atoms, preferably $C_5$ to $C_{30}$ acids such as saturated straight chain fatty acids including caprylic acid, capric acids, lauric acid, myristic acid, palmitic acid, stearic acid, arachic acid, and behenic acid, or the corresponding branched chain fatty acids or unsaturated fatty acids such as oleic acid, or mixtures of any of these materials.

Esters should be used in a amount such that the improved wear and corrosion resistance provided by the PAO lubricating oils of this disclosure are not adversely affected.

Non-conventional or unconventional basestocks and/or base oils include one or a mixture of basestock(s) and/or base oil(s) derived from: (1) one or more Gas-to-Liquids (GTL) materials, as well as (2) hydrodewaxed, or hydroisomerized/cat (and/or solvent) dewaxed basestock(s) and/or base oils derived from synthetic wax, natural wax or waxy feeds, mineral and/or non-mineral oil waxy feed stocks such as gas oils, slack waxes (derived from the solvent dewaxing of natural oils, mineral oils or synthetic oils; e.g., Fischer-Tropsch feed stocks), natural waxes, and waxy stocks such as gas oils, waxy fuels hydrocracker bottoms, waxy raffinate, hydrocrackate, thermal crackates, foots oil or other mineral, mineral oil, or even non-petroleum oil derived waxy materials such as waxy materials recovered from coal liquefaction or shale oil, linear or branched hydrocarbyl compounds with carbon number of 20 or greater, preferably 30 or greater and mixtures of such basestocks and/or base oils.

GTL materials are materials that are derived via one or more synthesis, combination, transformation, rearrangement, and/or degradation/deconstructive processes from gaseous carbon-containing compounds, hydrogen-containing compounds and/or elements as feed stocks such as hydrogen, carbon dioxide, carbon monoxide, water, methane, ethane, ethylene, acetylene, propane, propylene, propyne, butane, butylenes, and butynes. GTL basestocks and/or base oils are GTL materials of lubricating viscosity that are generally derived from hydrocarbons; for example, waxy synthesized hydrocarbons, that are themselves derived from simpler gaseous carbon-containing compounds, hydrogen-containing compounds and/or elements as feed stocks. GTL basestock(s) and/or base oil(s) include oils boiling in the lube oil boiling range (1) separated/fractionated from synthesized GTL materials such as, for example, by distillation and subsequently subjected to a final wax processing step which involves either or both of a catalytic dewaxing process, or a solvent dewaxing process, to produce lube oils of reduced/low pour point; (2) synthesized wax isomerates, comprising, for example, hydrodewaxed or hydroisomerized cat and/or solvent dewaxed synthesized wax or waxy hydrocarbons; (3) hydrodewaxed or hydroisomerized cat and/or solvent dewaxed Fischer-Tropsch (F-T) material (i.e., hydrocarbons, waxy hydrocarbons, waxes and possible analogous oxygenates); preferably hydrodewaxed or hydroisomerized/followed by cat and/or solvent dewaxing dewaxed F-T waxy hydrocarbons, or hydrodewaxed or hydroisomerized/followed by cat (or solvent) dewaxing dewaxed, F-T waxes, or mixtures thereof.

GTL basestock(s) and/or base oil(s) derived from GTL materials, especially, hydrodewaxed or hydroisomerized/followed by cat and/or solvent dewaxed wax or waxy feed, preferably F-T material derived basestock(s) and/or base oil(s), are characterized typically as having kinematic viscosities at 100° C. of from 2 mm$^2$/s to 50 mm$^2$/s (ASTM D445). They are further characterized typically as having pour points of −5° C. to −40° C. or lower (ASTM D97). They are also characterized typically as having viscosity indices of 80 to 140 or greater (ASTM D2270).

In addition, the GTL basestock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL basestock(s) and/or base oil(s) typically have very low sulfur and nitrogen content, generally containing less than 10 ppm, and more typically less than 5 ppm of each of these elements. The sulfur and nitrogen content of GTL basestock(s) and/or base oil(s) obtained from F-T material, especially F-T wax, is essentially nil. In addition, the absence of phosphorous and aromatics make this materially especially suitable for the formulation of low SAP products.

The term GTL basestock and/or base oil and/or wax isomerate basestock and/or base oil is to be understood as embracing individual fractions of such materials of wide viscosity range as recovered in the production process, mixtures of two or more of such fractions, as well as mixtures of one or two or more low viscosity fractions with one, two or more higher viscosity fractions to produce a blend wherein the blend exhibits a target kinematic viscosity.

The GTL material, from which the GTL basestock(s) and/ or base oil(s) is/are derived is preferably an F-T material (i.e., hydrocarbons, waxy hydrocarbons, wax).

Base oils for use in the formulated PAO lubricating oils useful in the present disclosure are any of the variety of oils corresponding to API Group I, Group II, Group III, Group IV, Group V and Group VI oils and mixtures thereof, preferably API Group II, Group III, Group IV, Group V and Group VI oils and mixtures thereof, more preferably the Group III to Group VI base oils due to their exceptional volatility, stability, viscometric and cleanliness features. Minor quantities of Group I stock, such as the amount used to dilute additives for blending into formulated lube oil products, can be tolerated but should be kept to a minimum, i.e. amounts only associated with their use as diluent/carrier oil for additives used on an "as received" basis. Even in regard to the Group II stocks, it is preferred that the Group II stock be in the higher quality range associated with that stock, i.e. a Group II stock having a viscosity index in the range 100<VI<120.

In addition, the GTL basestock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL basestock(s) and/or base oil(s) and hydrodewaxed, or hydroisomerized/cat (and/or solvent) dewaxed basestock(s) and/or base oil(s) typically have very low sulfur and nitrogen content, generally containing less than 10 ppm, and more typically less than 5 ppm of each of these elements. The sulfur and nitrogen content of GTL basestock(s) and/or base oil(s) obtained from F-T material, especially F-T wax, is essentially nil. In addition, the absence of phosphorous and aromatics make this material especially suitable for the formulation of low sulfur, sulfated ash, and phosphorus (low SAP) products.

The basestock component of the present PAO lubricating oils will typically be from 50 to 99 weight percent of the total composition (all proportions and percentages set out in this specification are by weight unless the contrary is stated) and more usually in the range of 80 to 99 weight percent.

Other Additives

The formulated lubricating oil useful in the present disclosure may additionally contain one or more of the other commonly used lubricating oil performance additives including but not limited to dispersants, other detergents, corrosion inhibitors, rust inhibitors, metal deactivators, other anti-wear agents and/or extreme pressure additives, anti-seizure agents, wax modifiers, viscosity index improvers, viscosity modifiers, fluid-loss additives, seal compatibility agents, other friction modifiers, lubricity agents, anti-staining agents, chromophoric agents, defoamants, demulsifiers, emulsifiers, densifiers, wetting agents, gelling agents, tackiness agents, colorants, and others. For a review of many commonly used additives, see Klamann in Lubricants and Related Products, Verlag Chemie, Deerfield Beach, Fla.; ISBN 0-89573-177-0. Reference is also made to "Lubricant Additives Chemistry and Applications" edited by Leslie R. Rudnick, Marcel Dekker, Inc. New York, 2003 ISBN: 0-8247-0857-1.

The types and quantities of performance additives used in combination with the instant disclosure in lubricant compositions are not limited by the examples shown herein as illustrations.

Viscosity Improvers

Viscosity improvers (also known as Viscosity Index modifiers, and VI improvers) increase the viscosity of the oil composition at elevated temperatures which increases film thickness, while having limited effect on viscosity at low temperatures.

Suitable viscosity improvers include high molecular weight hydrocarbons, polyesters and viscosity index improver dispersants that function as both a viscosity index improver and a dispersant. Typical molecular weights of these polymers are between 10,000 to 1,000,000, more typically 20,000 to 500,000, and even more typically between 50,000 and 200,000.

Examples of suitable viscosity improvers are polymers and copolymers of methacrylate, butadiene, olefins, or alkylated styrenes. Polyisobutylene is a commonly used viscosity index improver. Another suitable viscosity index improver is polymethacrylate (copolymers of various chain length alkyl methacrylates, for example), some formulations of which also serve as pour point depressants. Other suitable viscosity index improvers include copolymers of ethylene and propylene, hydrogenated block copolymers of styrene and isoprene, and polyacrylates (copolymers of various chain length acrylates, for example). Specific examples include styrene-isoprene or styrene-butadiene based polymers of 50,000 to 200,000 molecular weight.

The amount of viscosity modifier may range from zero to 8 wt %, preferably zero to 4 wt %, more preferably zero to 2 wt % based on active ingredient and depending on the specific viscosity modifier used.

Antioxidants

Typical antioxidant include phenolic antioxidants, aminic antioxidants and oil-soluble copper complexes.

The phenolic antioxidants include sulfurized and non-sulfurized phenolic antioxidants. The terms "phenolic type" or "phenolic antioxidant" used herein includes compounds having one or more than one hydroxyl group bound to an aromatic ring which may itself be mononuclear, e.g., benzyl, or poly-nuclear, e.g., naphthyl and spiro aromatic compounds. Thus "phenol type" includes phenol per se, catechol, resorcinol, hydroquinone, naphthol, etc., as well as alkyl or alkenyl and sulfurized alkyl or alkenyl derivatives thereof, and bisphenol type compounds including such bi-phenol compounds linked by alkylene bridges sulfuric bridges or oxygen bridges. Alkyl phenols include mono- and poly-alkyl or alkenyl phenols, the alkyl or alkenyl group containing from 3-100 carbons, preferably 4 to 50 carbons and sulfurized derivatives thereof, the number of alkyl or alkenyl groups present in the aromatic ring ranging from 1 to up to the available unsatisfied valences of the aromatic ring remaining after counting the number of hydroxyl groups bound to the aromatic ring.

Generally, therefore, the phenolic anti-oxidant may be represented by the general formula:

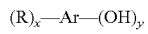

where Ar is selected from the group consisting of:

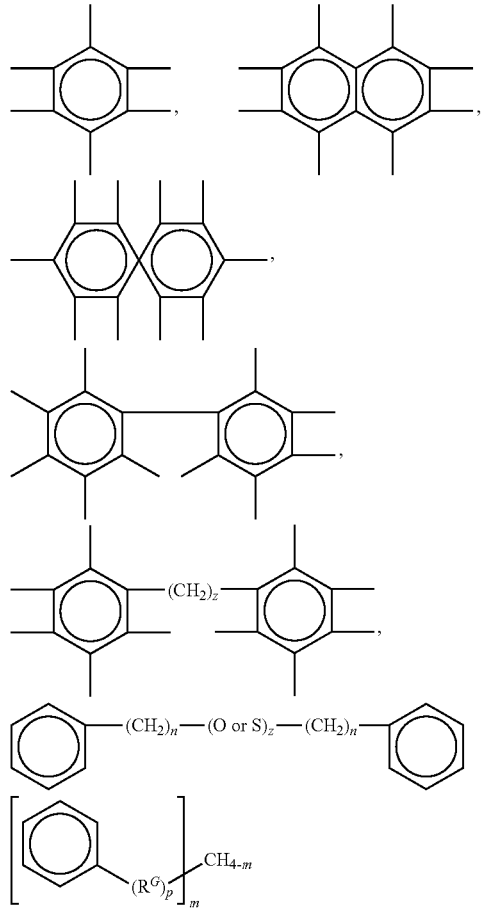

wherein R is a $C_3$-$C_{100}$ alkyl or alkenyl group, a sulfur substituted alkyl or alkenyl group, preferably a $C_4$-$C_{50}$ alkyl or alkenyl group or sulfur substituted alkyl or alkenyl group, more preferably $C_3$-$C_{100}$ alkyl or sulfur substituted alkyl group, most preferably a $C_4$-$C_{50}$ alkyl group, $R^g$ is a $C_{1-100}$ alkylene or sulfur substituted alkylene group, preferably a $C_2$-$C_{50}$ alkylene or sulfur substituted alkylene group, more preferably a $C_2$-$C_2$ alkylene or sulfur substituted alkylene group, y is at least 1 to up to the available valences of Ar, x ranges from 0 to up to the available valances of Ar-y, z ranges from 1 to 10, n ranges from 0 to 20, and m is 0 to 4 and p is 0 or 1, preferably y ranges from 1 to 3, x ranges from 0 to 3, z ranges from 1 to 4 and n ranges from 0 to 5, and p is 0.

Preferred phenolic antioxidant compounds are the hindered phenolics and phenolic esters which contain a sterically hindered hydroxyl group, and these include those derivatives of dihydroxy aryl compounds in which the hydroxyl groups are in the o- or p-position to each other. Typical phenolic anti-oxidants include the hindered phenols substituted with $C_1$+ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; 2-methyl-6-t-butyl-4-dodecyl phenol; 2,6-di-t-butyl-4 methyl phenol; 2,6-di-t-butyl-4-ethyl phenol; and 2,6-di-t-butyl 4 alkoxy phenol; and

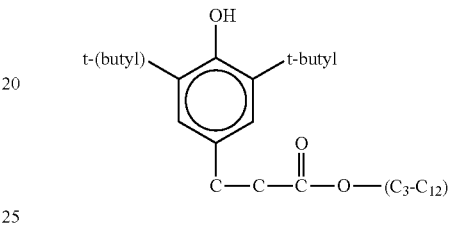

Phenolic type antioxidants are well known in the lubricating industry and commercial examples such as Ethanox® 4710, Irganox® 1076, Irganox® L1035, Irganox® 1010, Irganox® L109, Irganox® L118, Irganox® L135 and the like are familiar to those skilled in the art. The above is presented only by way of exemplification, not limitation on the type of phenolic anti-oxidants which can be used.

The phenolic antioxidant can be employed in an amount in the range of 0.1 to 3 wt %, preferably 1 to 3 wt %, more preferably 1.5 to 3 wt % on an active ingredient basis.

Aromatic amine antioxidants include phenyl-α-naphthyl amine which is described by the following molecular structure:

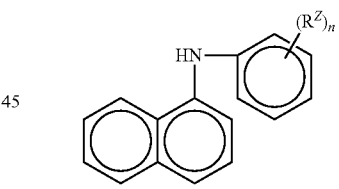

wherein $R^z$ is hydrogen or a $C_1$ to $C_{14}$ linear or C to $C_{1-4}$ branched alkyl group, preferably $C_1$ to $C_{10}$ linear or $C_3$ to $C_{10}$ branched alkyl group, more preferably linear or branched $C_6$ to $C_8$ and n is an integer ranging from 1 to 5 preferably 1. A particular example is Irganox L06.

Other aromatic amine antioxidants include other alkylated and non-alkylated aromatic amines such as aromatic monoamines of the formula $R^8R^9R^{10}N$ where $R^8$ is an aliphatic, aromatic or substituted aromatic group, $R^9$ is an aromatic or a substituted aromatic group, and $R^{10}$ is H, alkyl, aryl or $R^{11}S(O)_xR^2$ where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to 20 carbon atoms, and preferably contains from 6 to 12 carbon atoms. The aliphatic group is a saturated aliphatic group. Preferably, both $R^8$ and $R^9$ are aromatic or substituted aromatic groups, and the aromatic group may be a fused ring aromatic group such as naphthyl. Aromatic groups $R^1$ and $R^9$ may be joined together with other groups such as S.

Typical aromatic amines anti-oxidants have alkyl substituent groups of at least 6 carbon atoms. Examples of aliphatic groups include hexyl, heptyl, octyl, nonyl, and decyl. Generally, the aliphatic groups will not contain more than 14 carbon atoms. The general types of such other additional amine anti-oxidants which may be present include diphenylamines, phenothiazines, imidodibenzyls and diphenyl phenylene diamines. Mixtures of two or more of such other additional aromatic amines may also be present. Polymeric amine anti-oxidants can also be used.

Another class of antioxidant used in lubricating oil compositions and which may also be present are oil-soluble copper compounds. Any oil-soluble suitable copper compound may be blended into the lubricating oil. Examples of suitable copper antioxidants include copper dihydrocarbyl thio- or dithio-phosphates and copper salts of carboxylic acid (naturally occurring or synthetic). Other suitable copper salts include copper dithiacarbamates, sulphonates, phenates, and acetylacetonates. Basic, neutral, or acidic copper Cu(I) and or Cu(II) salts derived from alkenyl succinic acids or anhydrides are know to be particularly useful.

Such antioxidants may be used individually or as mixtures of one or more types of antioxidants, the total amount employed being an amount of 0.50 to 5 wt %, preferably 0.75 to 3 wt % (on an as-received basis).

Detergents

In addition to the alkali or alkaline earth metal salicylate detergent which is an essential component in the present disclosure, other detergents may also be present. While such other detergents can be present, it is preferred that the amount employed be such as to not interfere with the synergistic effect attributable to the presence of the salicylate. Therefore, most preferably such other detergents are not employed.

If such additional detergents are present, they can include alkali and alkaline earth metal phenates, sulfonates, carboxylates, phosphonates and mixtures thereof. These supplemental detergents can have total base number (TBN) ranging from neutral to highly overbased, i.e. TBN of 0 to over 500, preferably 2 to 400, more preferably 5 to 300, and they can be present either individually or in combination with each other in an amount in the range of from 0 to 10 wt %, preferably 0.5 to 5 wt % (active ingredient) based on the total weight of the formulated lubricating oil. As previously stated, however, it is preferred that such other detergent not be present in the formulation.

Such additional other detergents include by way of example and not limitation calcium phenates, calcium sulfonates, magnesium phenates, magnesium sulfonates and other related components (including borated detergents).

Dispersants

Suitable dispersants typically contain a polar group attached to a relatively high molecular weight hydrocarbon chain. The polar group typically contains at least one element of nitrogen, oxygen, and/or phosphorus. Typical hydrocarbon chains contain 50 to 400 carbon atoms.

A particularly useful class of dispersants are the alkenyl-succinic derivatives, typically produced by the reaction of a long chain substituted alkenyl succinic compound, usually a substituted succinic anhydride, with a polyhydroxy or polyamino compound. The long chain group constituting the oleophilic portion of the molecule which confers solubility in the oil, is normally a polyisobutylene group. Many examples of this type of dispersant are well known commercially and in the literature. Exemplary U.S. patents describing such dispersants are U.S. Pat. Nos. 3,172,892; 3,215,707; 3,219,666; 3,316,177; 3,341,542; 3,444,170; 3,454,607; 3,541,012; 3,630,904; 3,632,511; 3,787,374 and 4,234,435. Other types of dispersant are described in U.S. Pat. Nos. 3,036,003; 3,200,107; 3,254,025; 3,275,554; 3,438,757; 3,454,555; 3,565,804; 3,413,347; 3,697,574; 3,725,277; 3,725,480; 3,726,882; 4,454,059; 3,329,658; 3,449,250; 3,519,565; 3,666,730; 3,687,849; 3,702,300; 4,100,082; 5,705,458. A further description of dispersants may be found, for example, in European Patent Application No. 471 071, to which reference is made for this purpose.

Hydrocarbyl-substituted succinic acid compounds are popular dispersants. In particular, succinimide, succinate esters, or succinate ester amides prepared by the reaction of a hydrocarbon-substituted succinic acid compound preferably having at least 50 carbon atoms in the hydrocarbon substituent, with at least one equivalent of an alkylene amine are particularly useful.

Succinimides are formed by the condensation reaction between alkenyl succinic anhydrides and amines. Molar ratios can vary depending on the amine or polyamine. For example, the molar ratio of alkenyl succinic anhydride to TEPA can vary from 1:1 to 5:1.

Succinate esters are formed by the condensation reaction between alkenyl succinic anhydrides and alcohols or polyols. Molar ratios can vary depending on the alcohol or polyol used. For example, the condensation product of an alkenyl succinic anhydride and pentaerythritol is a useful dispersant.

Succinate ester amides are formed by condensation reaction between alkenyl succinic anhydrides and alkanol amines. For example, suitable alkanol amines include ethoxylated polyalkylpolyamines, propoxylated polyalkylpolyamines and polyalkenylpolyamines such as polyethylene polyamines. One example is propoxylated hexamethylenediamine.

The molecular weight of the alkenyl succinic anhydrides will typically range between 800 and 2,500. The above products can be post-reacted with various reagents such as sulfur, oxygen, formaldehyde, carboxylic acids such as oleic acid, and boron compounds such as borate esters or highly borated dispersants. The dispersants can be borated with from 0.1 to 5 moles of boron per mole of dispersant reaction product.

Mannich base dispersants are made from the reaction of alkylphenols, formaldehyde, and amines. Process aids and catalysts, such as oleic acid and sulfonic acids, can also be part of the reaction mixture. Molecular weights of the alkylphenols range from 800 to 2,500 or more.

Typical high molecular weight aliphatic acid modified Mannich condensation products can be prepared from high molecular weight alkyl-substituted hydroxyaromatics or $HN(R)_2$ group-containing reactants.

Examples of high molecular weight alkyl-substituted hydroxyaromatic compounds are polypropylphenol, polybutylphenol, and other polyalkylphenols. These polyalkylphenols can be obtained by the alkylation, in the presence of an alkylating catalyst, such as $BF_3$, of phenol with high molecular weight polypropylene, polybutylene, and other polyalkylene compounds to give alkyl substituents on the benzene ring of phenol having an average 600-100,000 molecular weight.

Examples of $HN(R)_2$ group-containing reactants are alkylene polyamines, principally polyethylene polyamines. Other representative organic compounds containing at least one $HN(R)_2$ group suitable for use in the preparation of Mannich condensation products are well known and include the mono- and di-amino alkanes and their substituted analogs, e.g., ethylamine and diethanol amine; aromatic diamines, e.g., phenylene diamine, diamino naphthalenes; heterocyclic amines, e.g., morpholine, pyrrole, pyrrolidine, imidazole, imidazolidine, and piperidine; melamine and their substituted analogs.

Examples of alkylene polyamine reactants include ethylenediamine, diethylene triamine, triethylene tetraamine, tetraethylene pentaamine, pentaethylene hexamine, hexaethylene heptaamine, heptaethylene octaamine, octaethylene nonaamine, nonaethylene decamine, and decaethylene undecamine and mixture of such amines having nitrogen contents corresponding to the alkylene polyamines, in the formula $H_2N-(Z-NH-)_nH$, mentioned before, Z is a divalent ethylene and n is 1 to 10 of the foregoing formula. Corresponding propylene polyamines such as propylene diamine and di-, tr-, tetra-, pentapropylene tri-, tetra-, penta- and hexaamines are also suitable reactants. The alkylene polyamines are usually obtained by the reaction of ammonia and dihalo alkanes, such as dichloro alkanes. Thus the alkylene polyamines obtained from the reaction of 2 to 11 moles of ammonia with 1 to 10 moles of dichloroalkanes having 2 to 6 carbon atoms and the chlorines on different carbons are suitable alkylene polyamine reactants.

Aldehyde reactants useful in the preparation of the high molecular products useful in this disclosure include the aliphatic aldehydes such as formaldehyde (also as paraformaldehyde and formalin), acetaldehyde and aldol ((3-hydroxybutyraldehyde). Formaldehyde or a formaldehyde-yielding reactant is preferred.

Preferred dispersants include borated and non-borated succinimides, including those derivatives from mono-succinimides, bis-succinimides, and/or mixtures of mono- and bis-succinimides, wherein the hydrocarbyl succinimide is derived from a hydrocarbylene group such as polyisobutylene having a Mn of from 500 to 5000 or more or a mixture of such hydrocarbylene groups. Other preferred dispersants include succinic acid-esters and amides, alkylphenol-polyamine-coupled Mannich adducts, their capped derivatives, and other related components. Such additives may be used in an amount of 0.1 to 20 wt %, preferably 0.1 to 8 wt %, more preferably 1 to 6 wt % (on an as-received basis) based on the weight of the total lubricant.

Pour Point Depressants

Conventional pour point depressants (also known as lube oil flow improvers) may also be present. Pour point depressant may be added to lower the minimum temperature at which the fluid will flow or can be poured. Examples of suitable pour point depressants include alkylated naphthalenes polymethacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers. Such additives may be used in amount of 0.0 to 0.5 wt %, preferably 0 to 0.3 wt %, more preferably 0.001 to 0.1 wt % on an as-received basis.

Corrosion Inhibitors/Metal Deactivators

Corrosion inhibitors are used to reduce the degradation of metallic parts that are in contact with the lubricating oil composition. Suitable corrosion inhibitors include aryl thiazines, alkyl substituted dimercapto thiodiazoles thiadiazoles and mixtures thereof. Such additives may be used in an amount of 0.01 to 5 wt %, preferably 0.01 to 1.5 wt %, more preferably 0.01 to 0.2 wt %, still more preferably 0.01 to 0.1 wt % (on an as-received basis) based on the total weight of the lubricating oil composition.

Seal Compatibility Additives

Seal compatibility agents help to swell elastomeric seals by causing a chemical reaction in the fluid or physical change in the elastomer. Suitable seal compatibility agents for lubricating oils include organic phosphates, aromatic esters, aromatic hydrocarbons, esters (butylbenzyl phthalate, for example), and polybutenyl succinic anhydride and sulfolane-type seal swell agents such as Lubrizol 730-type seal swell additives. Such additives may be used in an amount of 0.01 to 3 wt %, preferably 0.01 to 2 wt % on an as-received basis.

Anti-Foam Agents

Anti-foam agents may advantageously be added to lubricant compositions. These agents retard the formation of stable foams. Silicones and organic polymers are typical antifoam agents. For example, polysiloxanes, such as silicon oil or polydimethyl siloxane, provide antifoam properties. Antifoam agents are commercially available and may be used in conventional minor amounts along with other additives such as demulsifiers; usually the amount of these additives combined is less than 1 percent, preferably 0.001 to 0.5 wt %, more preferably 0.001 to 0.2 wt %, still more preferably 0.0001 to 0.15 wt % (on an as-received basis) based on the total weight of the lubricating oil composition.

Inhibitors and Anti-Rust Additives

Anti-rust additives (or corrosion inhibitors) are additives that protect lubricated metal surfaces against chemical attack by water or other contaminants. One type of anti-rust additive is a polar compound that wets the metal surface preferentially, protecting it with a film of oil. Another type of anti-rust additive absorbs water by incorporating it in a water-in-oil emulsion so that only the oil touches the surface. Yet another type of anti-rust additive chemically adheres to the metal to produce a non-reactive surface. Examples of suitable additives include zinc dithiophosphates, metal phenolates, basic metal sulfonates, fatty acids and amines. Such additives may be used in an amount of 0.01 to 5 wt %, preferably 0.01 to 1.5 wt % on an as-received basis.

In addition to the ZDDP anti-wear additives which are essential components of the present disclosure, other anti-wear additives can be present, including zinc dithiocarbamates, molybdenum dialkyldithiophosphates, molybdenum dithiocarbamates, other organo molybdenum-nitrogen complexes, sulfurized olefins, etc.

The term "organo molybdenum-nitrogen complexes" embraces the organo molybdenum-nitrogen complexes described in U.S. Pat. No. 4,889,647. The complexes are reaction products of a fatty oil, dithanolamine and a molybdenum source. Specific chemical structures have not been assigned to the complexes. U.S. Pat. No. 4,889,647 reports an infrared spectrum for a typical reaction product of that disclosure; the spectrum identifies an ester carbonyl band at 1740 $cm^{-1}$ and an amide carbonyl band at 1620 $cm^{-1}$. The fatty oils are glyceryl esters of higher fatty acids containing at least 12 carbon atoms up to 22 carbon atoms or more. The molybdenum source is an oxygen-containing compound such as ammonium molybdates, molybdenum oxides and mixtures.

Other organo molybdenum complexes which can be used in the present disclosure are tri-nuclear molybdenum-sulfur compounds described in EP 1 040 115 and WO 99/31113 and the molybdenum complexes described in U.S. Pat. No. 4,978, 464.

The lubricant compositions of this disclosure comprise an oil of lubricating viscosity and from 50 to 99 weight percent based on the total weight of the lubricant composition, of a basestock of this disclosure. The lubricant compositions have a kinematic viscosity (Kv) at 100° C. in any of the following ranges: from 10 to 1,000 cSt, from 25 to 950 cSt, from 75 cSt to 900 cSt, from 100 cSt to 800 cSt. The lubricant compositions have a viscosity index (VI) from 100 or more, 250 or more, alternatively 270 or more, alternatively 300 or more. As used herein, viscosity ($Kv_{100}$) is determined by ASTM D 445-01, and viscosity index (VI) is determined by ASTM D 2270-93 (1998).

The lubricant compositions of this disclosure possess low viscosity, low Noack volatility and superior low temperature properties. The polyolefin products of this disclosure can exhibit excellent bulk flow properties.

The lubricant compositions of this disclosure have a Noack volatility of no greater than 20 percent, preferably no greater than 18 percent, and more preferably no greater than 15 percent. As used herein, Noack volatility is determined by ASTM D-5800.

This disclosure provides lubricating oils useful as engine oils and in other applications characterized by excellent dispersancy characteristics, as well as excellent low volatility and low temperature characteristics. The lubricating oils are based on high quality basestocks including a major portion of a PAO base fluid of this disclosure. The lubricating oil basestock can be any PAO oil of this disclosure boiling in the lube oil boiling range, typically between 100 to 450° C. In the present specification and claims, the terms base oil(s) and basestock(s) are used interchangeably.

The viscosity-temperature relationship of a lubricating oil is one of the critical criteria which must be considered when selecting a lubricant for a particular application. Viscosity Index (VI) is an empirical, unitless number which indicates the rate of change in the viscosity of an oil within a given temperature range. Fluids exhibiting a relatively large change in viscosity with temperature are said to have a low viscosity index. A low VI oil, for example, will thin out at elevated temperatures faster than a high VI oil. Usually, the high VI oil is more desirable because it has higher viscosity at higher temperature, which translates into better or thicker lubrication film and better protection of the contacting machine elements.

In another aspect, as the oil operating temperature decreases, the viscosity of a high VI oil will not increase as much as the viscosity of a low VI oil. This is advantageous because the excessive high viscosity of the low VI oil will decrease the efficiency of the operating machine. Thus high VI (HVI) oil has performance advantages in both high and low temperature operation. VI is determined according to ASTM method D 2270-93 [1998]. VI is related to kinematic viscosities measured at 40° C. and 100° C. using ASTM Method D 445-01.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

EXPERIMENTAL

Product Characterization and Test Methods

Products were characterized by $^1$H NMR and $^{13}$C NMR as follows:
$^1$H NMR $^1$H NMR data was collected at either room temperature or 120° C. (for purposes of the claims, 120° C. shall be used) in a 5 mm probe using a spectrometer with a $^1$H frequency of at least 400 MHz. Data was recorded using a maximum pulse width of 45° C., 8 seconds between pulses and signal averaging 120 transients.
$^{13}$C NMR $^{13}$C NMR data was collected at 120° C. using a spectrometer with a $^{13}$C frequency of at least 100 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired with time averaging to provide a signal to noise level adequate to measure the signals of interest. Samples were dissolved in tetrachloroethane-$d_2$ (TCE) at concentrations between 10 to 15 wt % prior to being inserted into the spectrometer magnet.

Prior to data analysis spectra were referenced by setting the chemical shift of the TCE solvent signal to 74.39 ppm.

The kinematic viscosity (Kv) of the liquid products were measured using ASTM standards D445 and reported at temperatures of 100° C. (Kv at 100° C.) or 40° C. (Kv at 40° C.). The viscosity index (VI) was measured according to ASTM standard D2270 using the measured kinematic viscosities for the products. All molecular weights are g/mol unless otherwise noted.

The following examples are for purposes of illustration only and are non-limiting examples. The 1-decene used for all of the experiments was purified by mixing 1 liter of untreated raw material with 20 grams of activated 13× molecular sieve, (which was activated by calcining at 200° C. for at least four hours under a stream of purging dry nitrogen gas), and 10 grams of Oxi-Clear catalyst (purchased from Altech Associates, Inc of Deerfield, Ill. 60115) for at least two days inside a glove box under a dry, inert atmosphere of nitrogen. The molecular sieve and de-oxygenation catalyst were then removed by filtration in the glove box to provide purified 1-decene. Alternatively, the feeds were purified by passing through a bed of activated 13× molecular sieve alone under nitrogen atmosphere.

A mixture of oligomers of allylic vinyl terminated atactic polypropylene $\{[(CH_3)_2CHCH_2][(CH_3)CHCH_2]_xCH_2CH=CH_2$ where x=0, 1, 2, . . . ; 95% allylic vinyl end groups$\}$ was fractionated by preparative distillation into products with a narrower distribution of molecular weights. In this fractionation, six fractions were collected. Due to the atactic nature of the product, all the fractions are liquid and all are transparent and colorless. Each fraction was examined by $^1$H NMR, FTIR, and gas chromatography.

The composition Fraction 1 and Fraction 2 were quantified by $^{13}$C NMR. The Fraction 1 was composed of 24 mol % 4-methylpentene-1 (dimer), 62 mol % 4,6-dimethylheptene-1 (trimer), and 14 mol % 4,6,8-trimethylnonene-1 (tetramer; two isomers). The composition of Fraction 2 was 15.5 mol % 4,6-dimethylheptene-1 (trimer), 66.8 mol % 4,6,8-trimethylnonene-1 (tetramer; 2 isomers), and 17.7 mol % 4,6,8,10-tetramethyldodecene-1 (pentamer; 4 isomers). These two fractions of these new olefins were used as monomers for polymerization/oligomerization to obtain synthetic basestock or co-basestock.

The polymerization/oligomerization reactions were carried out under nitrogen ($N_2$) inert atmosphere or argon inert atmosphere. All solutions were prepared using purified toluene as solvent. In the examples, the following abbreviations are used:
Metallocene A=diphenylmethylidene(cyclopentadienyl)(9-fluorenyl) zirconium dichloride Activator D=N,N-dimethylanilinium tetra(perfluorophenyl) borate;
TIBA=tri-isobutylaluminum.

Example 1

Polymerization of 1-decene Using Metallocene A at 105° C. Under 30 psi $H_2$ Pressure A solution of 100.2 g of purified 1-decene, 2.635 g of a TIBA stock solution (1 mg TIBA/g solution) and 0.909 g of Metallocene A a stock solution (1 mg Metallocene A/g solution) was charged into a clean 600 ml autoclave equipped with an agitator, at room temperature. The reactor was then pressurized with 30 psig hydrogen. The mixture was then heated to 105° C. with stirring. A second solution containing 20 g toluene solvent and 1.342 g of Activator D stock solution (1 mg Activator A/g solution) was added and the reaction temperature was maintained at 105° C. overnight, then cooled down to room temperature, and any reactor pressure was vented. The liquid product was diluted with 50 ml toluene, stirred with 5 g activated alumina for half an hour and filtered to remove solids. The lube product was then isolated by removing the light ends (Toluene and unreacted 1-decene) with a rotary evaporator and high boiling $C_{20}$ dimer at 180° C. under high vacuum (1 mm) for two hours. The isolate the lube product was characterized by NMR and GPC ($M_w$=19,815; $M_n$=10,686; $M_w/M_n$=1.854). Yield: 56%.

Lubricant Properties of Basestock

The kinematic viscosity (Kv) of the liquid product at 100° C. was 622.3 cSt, at 40° C. was 7014.6 cSt with viscosity index (VI) of 289 and pour point was −30° C.

Example 2

Polymerization of Vinyl Terminated Polypropylene Oligomer (Fraction 1) by Using Metallocene A at 105° C. Under 30 psi H, Pressure Metallocene

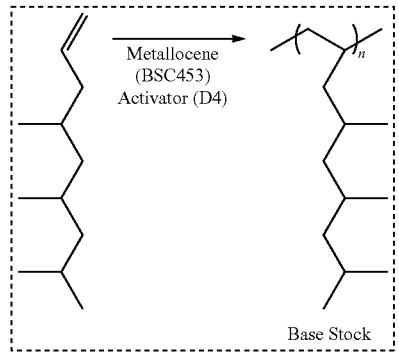

A solution of 20 g of dry vinyl terminated polypropylene oligomer, 80 g toluene, 2.641 g of a TIBA stock solution (1 mg TIBA/g solution) and 0.924 g of Metallocene A a stock solution (1 mg Metallocene A/g solution) was charged into a clean 600 ml autoclave equipped with an agitator, at room temperature. The reactor was then pressurized with 30 psig hydrogen. The mixture was then heated to 105° C. with stirring. A second solution containing 20.0 g toluene solvent and 1.304 g of Activator D stock solution (1 mg Activator A/g solution) was added and the reaction temperature was maintained at 105° C. overnight, then cooled down to room temperature, and any reactor pressure was vented. The liquid product was diluted with 50 ml toluene, stirred with 5 g activated alumina for half an hour and filtered to remove solids. The lube product was then isolated by removing the light ends (toluene) with a rotary evaporator and high boiling unreacted vinyl terminated polypropylene oligomer at 180° C. under high vacuum (1 mm). The isolated solid product was characterized by NMR and GPC ($M_w$=20,635; $M_n$=8470; $M_w/M_n$=2.4). Yield: 1.64 g (16.4%).

Example 3

Polymerization of Vinyl Terminated Polypropylene Oligomer (Fraction 2) by Using Metallocene A at 105° C. Under 30 psi $H_2$ Pressure A solution of 10 g of dry vinyl terminated polypropylene oligomer, 90 g toluene, 2.637 g of a TIBA stock solution (1 mg TIBA/g solution) and 0.926 g of Metallocene A stock solution (1 mg Metallocene A/g solution) was charged into a clean 600 ml autoclave equipped with an agitator, at room temperature. The reactor was then pressurized with 30 psig hydrogen. The mixture was then heated to 105° C. with stirring. A second solution containing 20.0 g toluene solvent and 1.304 g of Activator D stock solution (1 mg Activator A/g solution) was added and the reaction temperature was maintained at 105° C. overnight, then cooled down to room temperature, and any reactor pressure was vented. The liquid product was diluted with 50 ml toluene, stirred with 5 grams of activated alumina for half an hour and filtered to remove solids. The lube product was then isolated by removing the light ends (toluene) with a rotary evaporator and high boiling unreacted vinyl terminated $C_3$ oligomer at 180° C. under high vacuum (1 mm). The isolated solid product was characterized by NMR and GPC ($M_w$=5351; $M_n$=2173; $M_w/M_n$=2.5). Yield: 1.64 g (16.4%).

Example 4

Co-Oligomerization of 1-decene with Vinyl Terminated Polypropylene Oligomer (Fraction 2) by Using Metallocene a at 105° C. Under 30 Psi $H_2$ Pressure

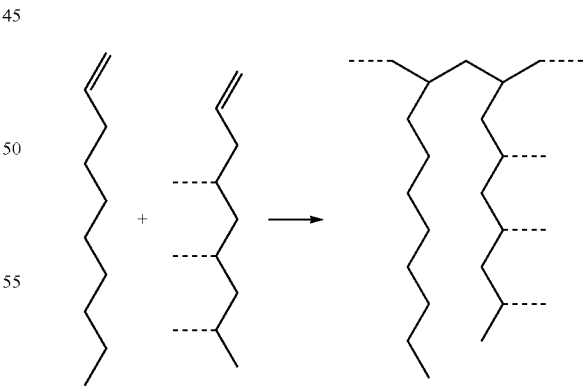

A solution of 20.1 g of dry terminated polypropylene oligomer, 40.1 g of 1-decene, 40 g of toluene, 2.637 g of a TIBA stock solution (1 mg TIBA/g solution) and 0.926 g of Metallocene A stock solution (1 mg Metallocene A/g solution) was charged into a clean 600 ml autoclave equipped with an agitator, at room temperature. The reactor was then pressurized with 30 psig hydrogen. The mixture was then heated to 105° C. with stirring. A second solution containing 20.18 g toluene solvent and 1.307 g of Activator D stock solution (1 mg Activator A/g solution) was added and the reaction temperature was maintained at 105° C. overnight, then cooled down to room temperature, and any reactor pressure was vented. The liquid product was diluted with 50 ml toluene, stirred with 5 g activated alumina for half an hour and filtered to remove solids. The lube product was then isolated by removing the light ends (toluene, 1-decene) with a rotary evaporator and high boiling unreacted vinyl terminated polypropylene oligomer and $C_{20}$ dimer at 180° C. under high vacuum (1 mm). The isolated lube product was characterized by NMR and GPC ($M_w$=5351; $M_n$=2173; $M_w/M_n$=2.5). Yield: 45.6 g (76.6%).

Lubricant Properties of Basestock

The kinematic viscosity (Kv) of the liquid product at 100° C. was 419.64 cSt, at 40° C. was 6312.96 cSt with viscosity index (VI) of 227.62 and pour point was −30° C.

Example 5

Polymerization of Vinyl Terminated Polypropylene Oligomer (Fraction 1) by Using Anhydrous $AlCl_3$ at 5° C.

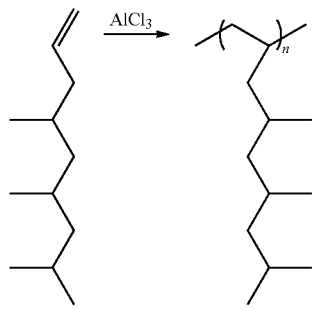

Charged 0.80 g of anhydrous $AlCl_3$ and 15 g decane in 350 ml round bottom flask under $N_2$ atmosphere. 10 g of vinyl terminated polypropylene oligomer was added very slowly by maintaining the temperature at 5° C. with vigorous starring. To this reaction mixture 0.03 g of water was added. After addition, the reaction mixture was stir for 3 h at 5° C. and allowed to warm to room temperature over night. The reaction was quenched by adding 10 ml water and 100 ml toluene. The product was washed with water (4×100 ml) and (1×75 ml) brine until, the aqueous layer pH ~7. The product was dried and filtered. The low boiling (toluene) component removed by rotavapory and high boiling component (decane) by air bath oven at 160-170° C. under high vacuum. The semi solid rubbery product was characterized by IR and GPC ($M_w$=15421; $M_n$=4968; $M_w/M_n$=3.1). Yield: 8 g (80%).

Example 6

Polymerization of Vinyl Terminated Polypropylene Oligomer (Fraction 1) by Using Anhydrous $AlCl_3$ at 60-65° C.

Charged 0.5 g of anhydrous $AlCl_3$ and 15 g decane in 350 ml round bottom flask under $N_2$ atmosphere. 5 g of vinyl terminated polypropylene oligomer was added very slowly by maintaining the temperature at 60-65° C. with vigorous starring. To this reaction mixture 0.015 g of water was added. After addition, the reaction mixture was stir for overnight at 65° C. The reaction was quenched by adding 10 ml water and 100 ml toluene. The product was washed with water (4×100 ml) and (1×75 ml) brine until, the aqueous layer pH ~7. The product was dried and filtered. The low boiling (toluene) component removed by rotavapory and high boiling component (decane) by air bath oven at 160-170° C. under high vacuum. The isolated viscous product was characterized by IR and GPC ($M_w$=6890; $M_n$=2448; $M_w/M_n$=2.8). Yield: 4.0 g (82%). The glass transition temperature of the fluid was determined using DSC with the result depicted in FIG. 1. The fluid showed single $T_g$ at −37.4° C. Thus, the fluid is amorphous with low $T_g$.

Lube Properties of Basestock

The kinematic viscosity (Kv) of the liquid product was measured using ASTM. The viscosity of the product at 100° C. was 424.68 cSt, at 40° C. was 26216.77 cSt with viscosity index (VI) of 120, and a glass transition temperature of −37.4° C.

Example 7

Low molecular weight (MW) polymers can be prepared using organometallic catalysts (Z—N, metallocene) and feeds such as ethylene, propylene, and butene monomers. For example, Mitsui's Lucant hydrocarbon fluid HC-40 (kinematic viscosity, $Kv_{100}$, at 100° C. of 40 cSt) has viscosity index (VI) of 155, pour point (PP) of −40° C. and Lucant hydrocarbon fluid HC-100 ($Kv_{100}$: 100 cSt) has VI of 165, PP of −32.5° C. Vinyl terminated macromers (VTM) aPP (mw 1000) was evaluated as synthetic basestock. The fluid had $Kv_{100}$ of 52 cSt, VI of 74, PP of −6° C. and glass transition temperature ($T_g$) of −40.5° C. The oxidative stability of the fluid was evaluated using HPDSC and oxidative induction time (OIT) was 167.3° C. The ethylene butene copolymer of $Kv_{100}$ of 141 cSt has VI of 169, PP of −30° C. and $T_g$ of −77.2° C. The OIT was 175.8° C. Thus, in accordance with this disclosure, the backbone prepared using ethylene/propylene, ethylene/butene versus propylene has different lube properties and these properties can be tunable based on starting monomers.

All documents described herein are incorporated by reference herein, including any priority documents and/or testing procedures to the extent they are not inconsistent with this text, provided however that any priority document not named in the initially filed application or filing documents is not incorporated by reference herein. When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:
1. A process for the preparation of vinyl terminated macromer (VTM) based synthetic basestocks which comprises:
(i) oligomerizing or polymerizing one or more allylic VTMs having a number average molecular weight from 84 to 10080, in the presence of a catalyst and under oligomerization or polymerization conditions sufficient to give said VTM based synthetic basestocks; or
(ii) oligomerizing or polymerizing one or more VTMs in the presence of a catalyst and under oligomerization or polymerization conditions sufficient to give said VTM based synthetic basestocks, wherein the VTMs are produced by the oligomerization of an alpha-olefin feed, said alpha-olefin feed comprising ethylene/alpha-olefin monomers or propylene/alpha-olefin monomers; or
(iii) co-oligomerizing or co-polymerizing one or more allylic VTMs having a number average molecular weight from 84 to 10080, and one or more alpha-olefins, in the presence of a catalyst and under co-oligomerization or co-polymerization conditions sufficient to give said VTM based synthetic basestocks,
wherein the VTM based synthetic basestocks have a viscosity ($Kv_{100}$) from 10 to 900 cSt at 100° C.; a viscosity index (VI) greater than 20; and a pour point (PP) less than 0° C.
2. The process of claim 1, wherein the VTM is one or more of:
(i) a vinyl terminated polymer having at least 5% allyl chain ends;
(ii) a vinyl terminated polymer having an Mn of at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;
(iii) a copolymer having an Mn of 300 g/mol or more (measured by $^1$H NMR) comprising (a) from 20 mol % to 99.9 mol % of at least one $C_5$ to $C_{40}$ higher olefin, and (b) from 0.1 mol % to 80 mol % of propylene, wherein the higher olefin copolymer has at least 40% allyl chain ends;
(iv) a copolymer having an Mn of 300 g/mol or more (measured by $^1$H NMR), and comprises (a) from 80 mol % to 99.9 mol % of at least one $C_4$ olefin, (b) from 0.1 mol % to 20 mol % of propylene; and wherein the vinyl terminated macromonomer has at least 40% allyl chain ends relative to total unsaturation;
(v) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;
(vi) a propylene oligomer, comprising more than 90 mol % propylene and less than 10 mol % ethylene wherein the oligomer has: at least 93% allyl chain ends, a number average molecular weight (Mn) of 500 g/mol to 20,000 g/mol, an isobutyl chain end to allylic vinyl group ratio of 0.8:1 to 1.35:1.0, and less than 100 ppm aluminum;
(vii) a propylene oligomer, comprising: at least 50 mol % propylene and from 10 mol % to 50 mol % ethylene, wherein the oligomer has: at least 90% allyl chain ends, an Mn of 150 g/mol to 10,000 g/mol, and an isobutyl chain end to allylic vinyl group ratio of 0.8:1 to 1.2:1.0, wherein monomers having four or more carbon atoms are present at from 0 mol % to 3 mol %;
(viii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an Mn of 150 g/mol to 10,000 g/mol, and an isobutyl chain end to allylic vinyl group ratio of 0.8:1 to 1.35:1.0;
(ix) a propylene oligomer, comprising: at least 50 mol % propylene, from 0.1 mol % to 45 mol % ethylene, and from 0.1 mol % to 5 mol % diene, wherein the oligomer has: at least 90% allyl chain ends, an Mn of 150 g/mol to 10,000 g/mol, and an isobutyl chain end to allylic vinyl group ratio of 0.7:1 to 1.35:1.0; and
(x) a homo-oligomer, comprising propylene, wherein the oligomer has: at least 93% allyl chain ends, an Mn of 500 g/mol to 20,000 g/mol, an isobutyl chain end to allylic vinyl group ratio of 0.8:1 to 1.2:1.0, and less than 1400 ppm aluminum.
3. The process of claim 1 wherein the catalyst comprises a metallocene catalyst or an acid catalyst.
4. The process of claim 1 wherein the one or more allylic VTMs comprise one or more allylic vinyl terminated atactic polypropylene macromers (VTM aPPs) having a number average molecular weight from 84 to 2520 and having a terminal allylic vinyl olefin content of at least 90%.
5. The process of claim 1 further comprising copolymerizing vinyl or other monomers with said VTM.
6. The process of claim 5 wherein the other monomers comprise maleic anhydride, styrene or derivatives thereof.
7. The process of claim 1 wherein the VTM based synthetic basestocks comprise a lubricating oil basestock.
8. A composition for use as a basestock for fuels and lubricants comprising:
(i) an oligomerization or polymerization product of one or more allylic VTMs having a number average molecular weight from 84 to 10080, wherein the one or more allylic VTMs are oligomerized or polymerized in the presence of a catalyst under oligomerization or polymerization conditions sufficient to give said composition; or
(ii) an oligomerization or polymerization product of one or more VTMs, wherein the one or more VTMs are oligomerized or polymerized in the presence of a catalyst under oligomerization or polymerization conditions sufficient to give said composition, wherein the one or more VTMs are produced by the oligomerization of an alpha-olefin feed, said alpha-olefin feed comprising ethylene/alpha-olefin monomers or propylene/alpha-olefin monomers; or
(iii) a co-oligomerization or co-polymerization product of one or more allylic VTMs having a number average molecular weight from 84 to 10080, and one or more alpha-olefins, wherein the one or more allylic VTMs and the one or more alpha-olefins are co-oligomerized or co-polymerized in the presence of a catalyst under co-oligomerization or co-polymerization conditions sufficient to give said composition; or
(iv) one or more VTMs having a number average molecular weight from 84 to 10080, wherein the one or more VTMs are hydrogenated under hydrogenation conditions sufficient to give the composition; or
(v) one or more allylic vinyl terminated atactic polypropylene macromers (VTM aPPs) having a number average molecular weight from 84 to 2520 and having a terminal allylic vinyl olefin content of at least 90%,
wherein the composition has a viscosity ($Kv_{100}$) from 10 to 900 cSt at 100° C.; a viscosity index (VI) greater than 20; and a pour point (PP) less than 0° C.

9. The composition of claim 8, wherein the VTM is one or more of:
   (i) a vinyl terminated polymer having at least 5% allyl chain ends;
   (ii) a vinyl terminated polymer having an Mn of at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;
   (iii) a copolymer having an Mn of 300 g/mol or more (measured by $^1$H NMR) comprising (a) from 20 mol % to 99.9 mol % of at least one $C_5$ to $C_{40}$ higher olefin, and (b) from 0.1 mol % to 80 mol % of propylene, wherein the higher olefin copolymer has at least 40% allyl chain ends;
   (iv) a copolymer having an Mn of 300 g/mol or more (measured by $^1$H NMR), and comprises (a) from 80 mol % to 99.9 mol % of at least one $C_4$ olefin, (b) from 0.1 mol % to 20 mol % of propylene; and wherein the vinyl terminated macromonomer has at least 40% allyl chain ends relative to total unsaturation;
   (v) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;
   (vi) a propylene oligomer, comprising more than 90 mol % propylene and less than 10 mol % ethylene wherein the oligomer has: at least 93% allyl chain ends, a number average molecular weight (Mn) of 500 g/mol to 20,000 g/mol, an isobutyl chain end to allylic vinyl group ratio of 0.8:1 to 1.35:1.0, and less than 100 ppm aluminum;
   (vii) a propylene oligomer, comprising: at least 50 mol % propylene and from 10 mol % to 50 mol % ethylene, wherein the oligomer has: at least 90% allyl chain ends, an Mn of 150 g/mol to 10,000 g/mol, and an isobutyl chain end to allylic vinyl group ratio of 0.8:1 to 1.2:1.0, wherein monomers having four or more carbon atoms are present at from 0 mol % to 3 mol %;
   (viii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an Mn of 150 g/mol to 10,000 g/mol, and an isobutyl chain end to allylic vinyl group ratio of 0.8:1 to 1.35:1.0;
   (ix) a propylene oligomer, comprising: at least 50 mol % propylene, from 0.1 mol % to 45 mol % ethylene, and from 0.1 mol % to 5 mol % diene, wherein the oligomer has: at least 90% allyl chain ends, an Mn of 150 g/mol to 10,000 g/mol, and an isobutyl chain end to allylic vinyl group ratio of 0.7:1 to 1.35:1.0; and
   (x) a homo-oligomer, comprising propylene, wherein the oligomer has: at least 93% allyl chain ends, an Mn of 500 g/mol to 20,000 g/mol, an isobutyl chain end to allylic vinyl group ratio of 0.8:1 to 1.2:1.0, and less than 1400 ppm aluminum.

10. The composition of claim 8 wherein the one or more allylic VTMs comprise one or more allylic vinyl terminated atactic polypropylene macromers (VTM aPPs) having a number average molecular weight from 84 to 2520 and having a terminal allylic vinyl olefin content of at least 90%.

11. The composition of claim 8 further comprising copolymerizing vinyl or other monomers with said VTM.

12. The composition of claim 8 wherein the monomers comprise maleic anhydride, styrene and derivatives thereof.

13. A lubricant composition comprising a lubricating oil basestock having the composition of claim 8.

14. The lubricant composition of claim 13 further comprising one or more of a viscosity improver, antioxidant, detergent, dispersant, pour point depressant, corrosion inhibitor, metal deactivator, seal compatibility additive, anti-foam agent, inhibitor, and anti-rust additive.

15. A method for tuning one or more properties of VTM based synthetic basestocks, said method comprising:
   selecting one or more VTMs, wherein the VTMs are produced by the oligomerization of an alpha-olefin feed, said alpha-olefin feed comprising ethylene/alpha-olefin monomers or propylene/alpha-olefin monomers; and
   oligomerizing or polymerizing the one or more VTMs in the presence of a catalyst and under oligomerization or polymerization conditions sufficient to give said VTM based synthetic basestocks,
   wherein the VTM based synthetic basestocks have a viscosity ($Kv_{100}$) from 10 to 900 cSt at 100° C.; a viscosity index (VI) greater than 20; and a pour point (PP) less than 0° C.

16. The method of claim 15 wherein the ethylene/alpha-olefin monomers comprise ethylene/propylene, ethylene/1-butene, ethylene/1-hexene, ethylene/1-octene, ethylene/1-decene, ethylene/1-dodecene, ethylene/1-tetradecene, ethylene/1-hexadecene and/or ethylene/1-octadecene; and the propylene/alpha-olefin monomers comprise propylene/ethylene, propylene/1-butene, propylene/1-hexene, propylene/1-octene, propylene/1-decene, propylene/1-dodecene, propylene/1-tetradecene, propylene/1-hexadecene and/or propylene/1-octadecene.

17. A vehicle having moving parts and containing a lubricant for lubricating the moving parts, the lubricant comprising from 50 to 99 weight percent, based on the total weight of the lubricant composition, of an oil basestock of the composition of claim 8.

* * * * *